(12) United States Patent
Tang et al.

(10) Patent No.: US 12,086,445 B1
(45) Date of Patent: Sep. 10, 2024

(54) MAINTAINING PARTITION-LEVEL PARITY DATA FOR IMPROVED VOLUME DURABILITY

(71) Applicant: Amazon Technologies, Inc., Seattle, WA (US)

(72) Inventors: Kun Tang, Bellevue, WA (US); Hon Ping Shea, Seattle, WA (US); Michael Scott Ryan, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 16/827,565

(22) Filed: Mar. 23, 2020

(51) Int. Cl.
　　*G06F 3/06*　　　(2006.01)
　　*G06F 11/10*　　(2006.01)
　　*G06F 11/20*　　(2006.01)

(52) U.S. Cl.
　　CPC .......... *G06F 3/0644* (2013.01); *G06F 3/0619* (2013.01); *G06F 3/0652* (2013.01); *G06F 3/067* (2013.01); *G06F 3/0683* (2013.01); *G06F 11/1076* (2013.01); *G06F 11/2074* (2013.01)

(58) Field of Classification Search
　　CPC .... G06F 3/0644; G06F 3/0619; G06F 3/0652; G06F 3/067; G06F 3/0683; G06F 11/1076; G06F 11/2074
　　See application file for complete search history.

(56) References Cited

U.S. PATENT DOCUMENTS

| 10,514,847 | B2 | 12/2019 | Kusters et al. | |
| 10,521,135 | B2 * | 12/2019 | Kusters | G06F 11/2058 |
| 10,592,337 | B1 * | 3/2020 | Banerjee | G06F 3/0644 |
| 2016/0371145 | A1 * | 12/2016 | Akutsu | G06F 11/1076 |
| 2018/0183868 | A1 | 6/2018 | Kusters et al. | |
| 2018/0365106 | A1 * | 12/2018 | Huang | G06F 3/064 |

OTHER PUBLICATIONS

U.S. Appl. No. 16/723,391, filed Dec. 20, 2019, Norbert P. Kusters et al.

* cited by examiner

*Primary Examiner* — David Yi
*Assistant Examiner* — Alan Otto
(74) *Attorney, Agent, or Firm* — Alexander A. Knapp; Kowert, Hood, Munyon, Rankin & Goetzel, P.C.

(57) ABSTRACT

A data storage system stores a plurality of partitions for a volume and at least one parity partition for the volume. The parity partition includes erasure encoded data that enables any one of the partitions to be reconstructed using the erasure encoded data of the parity partition. Additionally, the data storage system is configured to generate parity data updates in response to modifications to the volume and store updated parity data in the parity partition, such that a current state of any of the partitions of the volume can be re-created in response to a loss of one of the partitions.

20 Claims, 10 Drawing Sheets

MAINTAINING PARTITION-LEVEL PARITY DATA FOR IMPROVED VOLUME DURABILITY

BACKGROUND

The recent revolution in technologies for dynamically sharing virtualizations of hardware resources, software, and information storage across networks has increased the reliability, scalability, and cost efficiency of computing. For example, cloud service providers often provide virtualized computing services and virtualized data storage services to customers using shared hardware, software, and/or storage resources.

In order to provide such services, cloud service providers often use virtualized computing environments that are supported by block-based storage provided by a virtualized data storage service. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

In order to increase durability of data, some block-based storage systems may store multiple copies of a volume. Also, as volume sizes increase some block-based storage systems may partition the volume into multiple partitions and store respective replicas of each partition.

Figure 1A:
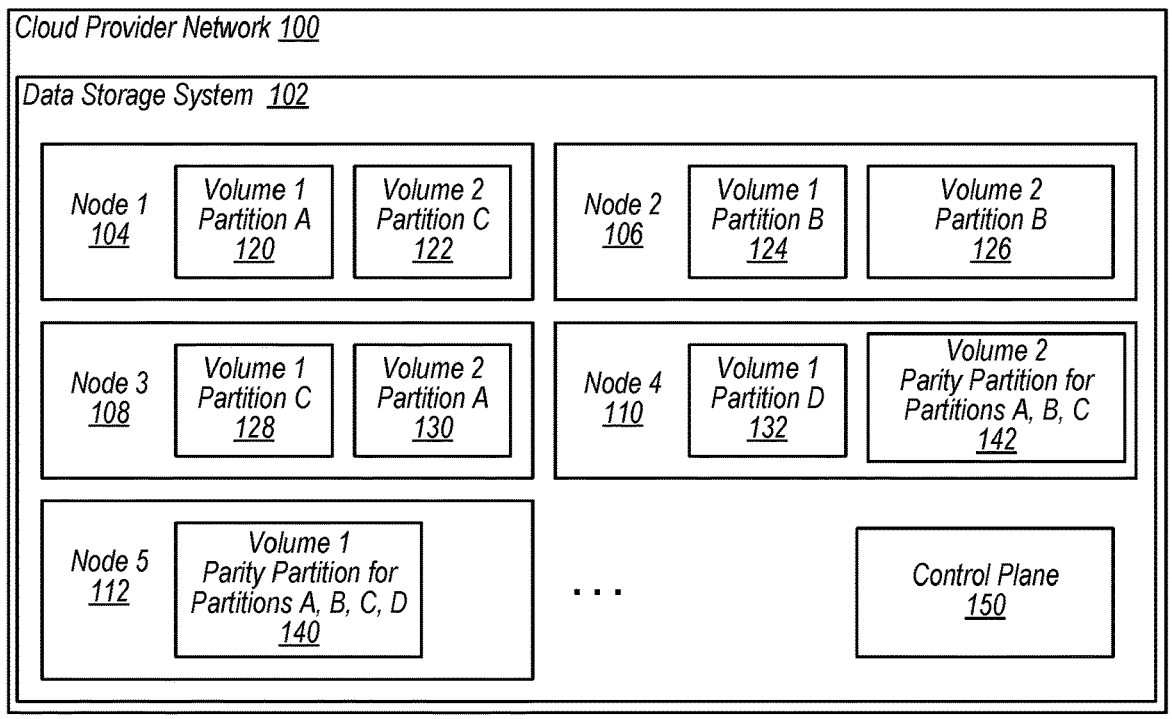
FIG. 1A illustrates a data storage system comprising a plurality of nodes that store partitions of a volume and that store at least one parity partition for the volume, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally described, aspects of the present disclosure relate to providing heightened, consistent durability for data that is stored across a number of networked hosts, for example storage servers in a cloud provider network. In particular, the present disclosure describes techniques for providing heightened durability for large block storage volumes that are distributed across multiple hosts. Durability refers to the ability to keep stored data consistent over time, so that the data does not suffer from bit rot, drive failures, or other forms of corruption. As an example, 99.999% ("5 nines") durability means that a volume is likely to lose one block out of 100,000 blocks every year.

A data storage system, for example provided as a cloud service, can use partitioning (e.g., RAID or RAID-like configurations) to store large volumes, with each partition stored on a different physical host (or set of hosts). Doing so can spread out the network load for serving input and output (I/O) requests to the data of the volume across multiple hosts. Each partition may be replicated one or more times for fault tolerance and availability. However, increased partitioning can result in lower durability for a volume, because failure (e.g., loss of data) from any one of the partitions leads to loss of the volume. Accordingly, it may be more difficult to provide the same level of durability for volumes of different sizes.

The aforementioned technical challenges, among others, are addressed in some embodiments by a dynamically adjustable strategy for provisioning one or more parity partitions for a given volume, based on the size of the volume (e.g., number of partitions) and a durability guarantee for the volume (e.g., a guarantee from a cloud provider to a customer about the durability they can expect for their volume data hosted in the cloud). The parity partition(s) can include XOR values that are usable to reconstruct the data of the volume, even if a replica set storing one of the partitions is lost. A control plane of the data storage system can determine which volumes should have additional parity partition(s) and how many parity partitions those volumes should have based on analysis of historical data for a number of volumes, where the historical data indicates number of partitions in a given volume, and a comparison between the actual data loss experienced by the volume over a period of time and the durability guarantee that the volume was intended to satisfy. Beneficially, the disclosed techniques enable a provider of a data storage service to consistently meet durability requirements across a set of volumes having different partitioning strategies.

According to some embodiments, a data storage system includes multiple nodes, wherein each of the nodes includes a computing device and a storage device. For example, the nodes may include one or more processors and one or more storage devices that may implement a log-based storage. At least one of the nodes, or another computing device of the data storage system, is configured to implement a control plane for the data storage system. For a volume to be stored in the data storage system, the control plane is configured to assign respective ones of a plurality of partitions of the volume to respective ones of the nodes, wherein the respective ones of the nodes are configured to host the assigned respective partitions of the volume. The control plane is also configured to assign a parity partition for the volume to another one of the nodes, wherein the other one of the nodes is configured to host the assigned parity partition. Additionally, the control plane is configured to cause parity data to be generated for the parity partition, wherein the parity data is generated by applying an erasure code to volume data of the plurality of partitions of the volume. Additionally, the control plane is configured to cause the generated parity data to be stored to the parity partition hosted by the other one of the nodes. Moreover, in response to a failure of at least one of the partitions, the control plane is configured to reconstruct the at least one failed partition using the parity data stored in the parity partition hosted by the other node of the data storage system and the volume data of the remaining partitions of the volume.

According to some embodiments, a method includes storing partitions of a volume in a plurality of nodes of a data storage system. The method also includes storing parity data for a parity partition for the volume in another node of the data storage system, wherein the parity data is generated by applying an erasure code to volume data of the partitions of the volume. Additionally, the method includes receiving a write request directed to a segment of one of the partitions of the volume, reading volume data for the segment from a storage of one of the nodes hosting the partition, generating a parity data update for the segment based on applying the erasure code to volume data read for the segment and to the write data included with the write request, calculating based on the parity data update updated parity data for the segment of the volume to which the write request is directed, and causing the updated parity data to be written to a segment of the parity partition storing parity data for the segment of the partition. In some embodiments, generating the parity data update may include a node storing the partition that includes the segment to which the write request is directed calculating an erasure code based on the volume data of the segment prior to applying the write and based on the write data included with the write request, wherein an output of the erasure code is a parity data update that is then sent to the node storing the parity partition. In some embodiments, the parity data update is sent along with a write number to the parity partition. In some embodiments, a sequence number may further be sent to the parity partition with the parity data update and the write number, wherein the sequence number is a monotonically increasing number assigned by a control plane of the data storage system and updated in response to a membership change for a set of nodes functioning as a primary node and a secondary node for a partition of the volume stored in the data storage system. Furthermore, the node hosting the parity partition may read the parity data for the segment from a storage of the node hosting the parity partition or from a persistent data storage of the data storage system, and calculate a new parity for the segment, wherein the new parity is calculated using an erasure code that takes the prior parity data and the parity data update as inputs to the erasure code and that yields updated parity data for the segment that is then stored in the parity partition.

According to some embodiments, one or more non-transitory computer-readable media store program instructions for implementing a control plane for a data storage system. The program instructions, when executed on or across one or more processors, cause the one or more processors to detect a failed partition of a plurality of partitions of a volume stored in the data storage system, wherein respective ones of the plurality of partitions are hosted by respective ones of a plurality of nodes of the data storage system, and wherein another node of the data storage system hosts a parity partition for the volume, wherein the parity partition comprises parity data generated by applying an erasure code to volume data of the plurality of partitions of the volume. The program instructions also cause the one or more processors to reconstruct the failed partition using the parity data of the parity partition hosted by the other node of the data storage system and using the volume data of the partitions of the volume hosted by nodes of the data storage system that have not failed.

The traffic and operations of a cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, and/or system state information). The data plane includes customer resources that are implemented on the cloud provider network (e.g., computing instances, containers, block storage volumes, databases, and/or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, to reconstruct the failed partition, the program instructions cause the one or more processors to first reconstruct the failed partition using an initial set of parity data generated by applying the erasure code to the partition. The program instructions may then cause the one or more processors to reconstruct writes applied to the now failed partition using one or more parity data updates stored to the parity partition, wherein each parity data update includes an associated write number and an associated sequence number. The program instructions may then cause the one or more processors to apply the reconstructed write data to the reconstructed partition, reconstructed from the initial set of parity data. The program instructions may further cause the writes to be applied to the reconstructed partition based on their respective write numbers to generate a reconstructed version of the failed partition that is updated and reflects all committed writes applied to the partition prior to it failing.

In some embodiments, the program instructions may cause one or more processors of a node hosting a parity partition to recalculate a new parity for the parity partition in response to each instance of a parity data update received by the node hosting the parity partition. For example, the node hosting the parity partition may apply the parity data updates to restore parity for each parity data update received in response to a write being performed. Thus, in some embodiments, the parity data of the parity partition may be continuously updated/recalculated and may reflect a new parity that includes writes committed to the data storage system such that reconstructing a failed partition from the parity data simply comprises re-constructing the failed partition using current parity data stored for the volume that has been updated in response to each committed write to reflect all writes committed in the data storage system.

Such a data storage system as described herein, that maintains a parity partition for a volume, may provide greater data durability and storage efficiency than other data storage systems. For example, some data storage systems, may store replicas of a volume or replicas of a volume partition. However, in such systems the replicated data may consume a significant amount of storage space. For example, for a volume with 10 partitions, such systems would store 10 replicas, one for each partition. Other data storage systems may not create full replicas for each partition, but may instead apply an erasure code to respective individual writes, such that the write data can be re-created in case of a failure. However, in such systems, if a volume partition becomes corrupted or otherwise fails, the whole volume may be lost even though data for individual writes can be re-created.

Additionally, providing a high-level of data durability for a volume stored in a data storage system may become more difficult to achieve as a size of the volume increases such that several partitions of the volume are stored in the data storage system. This is because if a single partition is corrupted or fails, the whole volume fails. Thus the probability of failure for the volume increases as the number of partitions for the volume increases. As an example, a volume with 16 partitions may have a probability of failure that is 16× that of a volume with a single partition.

In order to ensure data durability guarantees are met for larger volumes comprising multiple partitions, a data storage system as described herein, may create and maintain a parity partition for the volume in addition to the "main" partitions of the volume. The parity partition may include parity data generated by applying an erasure code to the data volume of the main partitions. Thus, if any one of the main partitions were to fail, the data storage system could re-create the failed partition using the parity data of the parity partition. Additionally, in contrast to systems that store replicas for each volume or volume partition, a parity partition may store erasure encoded data that occupies less storage space in the data storage system than a full copy of a partition would occupy. For example, in some embodiments an erasure code may be applied to the volume data of the main partitions to generate the parity data that is stored to the parity partition. In some embodiments, an erasure code applied to the volume data may be include XOR operations, Galois field operations, etc.

Additionally, in some embodiments, the data storage system may maintain the parity partition data such that the parity partition data reflects the current state of the volume, including all writes committed for the volume. In some embodiments, to do this, a node hosting a volume partition to which a write is directed may read a segment of the partition into memory prior to applying the write. For, example, the node hosting the volume may read volume data into memory for a particular offset and length of the volume. The node hosting the volume and/or a node implementing a control plane for the data storage system may further calculate an erasure code for the volume data of the segment read into memory and a received write. The calculated erasure code may be sent to a parity partition along with a write number for the write and/or a current sequence number for the volume partition. In some embodiments, the node hosting the parity partition may use the calculated erasure code to calculate a new parity, such that the parity data stored in the parity partition is continuously recalculated to reflect a current state of the volume. In other embodiments, the node hosting the parity partition may store the parity data update comprising the calculated erasure code, write number, and current sequence number and may apply the parity updates to previously stored parity data for the volume as part of a reconstruction process to reconstruct a current version of a failed partition in response to a failure of one of the partitions of the volume.

In some embodiments, the generation and storage of updated parity data may be performed asynchronously with committing a write in the data storage system for the volume. For example, the generation and updating of the parity data stored in the parity partition may be performed by another thread outside of the write path, such that committing a write in the data storage system does not depend on (or need to wait on) the parity partition data being updated.

In some embodiments, write data may be initially stored in a storage of a primary node and replicated to a storage of another node, and may be asynchronously moved to multiple mass storage devices in different data storage sleds that form a RAID array (random array of independent disks) to store the data. In some embodiments, parity data of a parity partition may also be stored in a storage of a primary node hosting the parity partition and may be replicated to a storage of another node hosting a replica of the parity partition. Also, the parity data may be asynchronously moved to multiple mass storage devices in different data storage sleds that form a RAID array.

In some embodiments, recently stored write data or frequently accessed data may remain in a node storage to allow for low latency access to the data. The write data (or parity data) may then be moved to mass storage devices in data storage sleds of the data storage system after a certain amount of time has elapsed since the write data (or parity data) was last stored. Moving the data (or parity data) to the mass storage devices may increase the durability of the data (or parity data) as compared to being stored in a storage of a primary node and being replicated to a storage of a secondary node. In some embodiments, other criteria may be used to determine when data stored in a storage of a primary node is to be moved (e.g. flushed) to mass storage devices of data storage sleds of a data storage system. For example, data may be collected in a log of a primary node and upon an amount of data being stored in the log exceeding a threshold amount, the data may be moved to mass storage devices of data storage sleds of the data storage system. In some embodiments, a control plane of a data storage system may verify that updated parity data for all writes to be flushed has been committed to a parity partition for the volume prior to performing a flush. This is beneficial, because prior to the flush both the volume data prior to the write and the write data of the write may be stored in a log-based storage of a node hosting the partition that was written to, such that a failed parity update to the parity partition can be re-tried using the volume data prior to the read and the write data stored in the log of the node hosting the partition that was written to and can be committed prior to performing a flush operation for the volume partition.

In some embodiments, a data storage unit of a data storage system may include multiple nodes, multiple data storage sleds, and at least two networking devices. The data storage unit may further include connectors for coupling the data storage unit with at least two separate power sources. The data storage unit may also include at least two power distribution systems within the data storage unit to provide redundant power to the nodes, the data storage sleds, and the networking devices of the data storage unit. Furthermore, the at least two networking devices of the data storage unit may implement at least two redundant networks within the data storage unit that enable communications between the nodes of the data storage unit and the data storage sleds of the data storage unit. Furthermore, the at least two networking devices of the data storage unit may implement at least two redundant networks within the data storage unit that enable communications between the nodes of the data storage unit and external clients of the data storage unit. In some embodiments, a data storage unit that includes redundant networks and redundant power may provide high reliability and data durability for data storage and access while storing data locally within devices mounted within a single rack.

In some embodiments, a data storage unit of a data storage system may include multiple nodes that are assigned network addresses that are routable from devices external to the data storage unit. Thus, external clients may communicate directly with nodes of a data storage unit without the communications being routed through a control plane of the data storage system that is external to the data storage unit, such as a zonal control plane. Also, a data storage system that includes multiple data storage units may implement a zonal control plane that assigns volumes or volume partitions to particular ones of the data storage units of the data storage system. Also, a zonal control plane may coordinate operations between data storage units, such as rebalancing loads by moving volumes or volume partitions between data storage units. However, a data storage unit may also implement a local control plane configured to perform fail over operations for nodes and mass storage devices of data storage sleds of the data storage unit. Because nodes of a data storage unit may communicate directly with client devices and because a local control plane may manage fail over operations within a data storage unit, the data storage unit may operate autonomously without relying on a zonal control plane once a volume has been created on the data storage unit.

In some embodiments, in order to prevent corruption of data stored in mass storage devices of a data storage system, a data control plane may be at least partially implemented on a sled controller of a data storage sled of the data storage system. The data storage sled may include multiple mass storage devices serviced by the sled controller. Also, portions of respective mass storage devices of a particular data storage sled may be reserved for a particular volume partition serviced by a particular node functioning as a primary node for the particular volume partition. In order to reserve the portions for the particular volume partition, a sled controller of a data storage sled may provide a token to a primary node requesting to reserve the portions. Once the portions are reserved for the particular volume partition by the node acting as the primary node, the node while acting as a primary node for the particular volume partition, may provide the token to the sled controller along with a write request when writing new data to the portions. The sled controller may verify the token and determine the node is authorized to write to the portions reserved for the particular volume partition. Also, the sled controller may be configured to prevent writes from other nodes that are not authorized to write to the particular portions of the mass storage devices of the data storage sled that includes the sled controller. The sled controller may refuse to perform a write request based on being presented an invalid token or based on a token not being included with a write request.

In some embodiments, a control plane such as a local control plane or a zonal control plane of a data storage system may issue unique sequence numbers to nodes of the data storage system to indicate which node is a primary node for a particular volume partition. A primary node may present a sequence number issued from a control plane to respective ones of the sled controllers of respective ones of the data storage sleds to reserve, for a particular partition, respective portions of mass storage devices serviced by the respective ones of the respective sled controllers. In response, the sled controllers may issue a token to the primary node to be included with future write requests directed to the respective portions.

In order to facilitate a failover operation between a primary node and a secondary node, a control plane may issue new credentials, e.g. a new sequence number, to a node assuming a role of primary node for a volume partition. The newly assigned primary node may present the credentials, e.g. new sequence number, to respective sled controllers to receive respective tokens that supersede tokens previously issued to a previous node acting as a primary node for the particular volume partition. Thus, during a fail over event, a previous primary node may be fenced off from portions of mass storage devices to prevent corruption of data stored on the mass storage devices during the failover event.

In some embodiments, a control plane may issue a sequence number for a parity partition to the node hosting the parity partition. Additionally, the parity partition may include current sequence numbers for each of the partitions that the parity partition stores parity data for.

FIG. 1A illustrates a data storage system comprising a plurality of nodes that store partitions of a volume and that store at least one parity partition for the volume, according to some embodiments.

The data storage system 102 can be part of a cloud provider network 100. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The data storage system 102 can provide persistent data storage in the form of volumes, for example through an elastic block store service (referred to in various implementations as cloud disks service, a managed disk service, a storage area network service, a persistent disk service, or a block volumes service). The nodes 104, 106, 108, 110, and 112 can be servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "block") can be, for example, 512 bytes, 1 kilobyte ("kB"), 4 kB, 8 kB, 16 kB, 32 kB, 64 kB, 128 KB, 256 kB, 512 KB, or larger, depending upon the implementation.

User volumes, which can be treated as an individual hard drive ranging for example from 1 GB to 1 terabyte TB (or more) in size, are made of one or more blocks stored on the nodes 104, 106, 108, 110, and 112. Although treated as an individual hard drive, it will be appreciated that a volume may be stored as one or more virtualized devices implemented on one or more underlying physical host devices. Volumes may be partitioned a number of times (e.g., up to 16) depending upon their size, with each partition hosted by a different one of nodes 104, 106, 108, 110, and 112. These volumes provided persistent, dedicated storage that can be attached to particular virtual machine instances that run on other servers in the cloud provider network. The block nodes 104, 106, 108, 110, and 112 may have built-in redundancy for volumes by replicating the volume (or an individual partition of the volume) across multiple nodes within an availability zone, which means that volumes will not fail if an individual drive fails or some other single failure occurs.

Data storage system 102 includes nodes 104, 106, 108, 110, and 112. In some embodiments, a data storage system, such as data storage system 102 could include more or less nodes that shown in FIG. 1A. In some embodiments, different partitions of a volume may be assigned to, and hosted by, different ones of the nodes of the data storage system. Additionally, for volumes comprising multiple partitions, different ones of the partitions may each be assigned to, and hosted by, a different node. Also, at least one other node of the data storage system may be assigned, and host, a parity partition for the volume, wherein the parity partitions includes parity data for the other "main" partitions of the volume. As shown in FIG. 1A, in some embodiments, a single node of the data storage system may host more than one partition or parity partition for a volume.

For example, volume 1 includes partition A (120), partition B (124), partition C (128) and partition D (132) respectively stored on node 1 (104), node 2 (106), node 3 (108), and node 4 (110). Additionally, node 5 (112) stores parity partition 140 that includes parity data for each of partitions A, B, C, and D of volume 1. Also, volume 2 includes partitions A (130), B (126), and C (128) that are respectively stored on nodes 3 (108), 2 (106), and 1 (104). Additionally, node 4 (110) stores parity partition 142 for volume 2 that includes parity data for each of partitions A, B, and C, of volume 2. Also as noted above, node 4 also stores partition D (132) of volume 1. Thus, as shown in FIG. 1A, in some embodiments a given node of a data storage system may store multiple partitions for different volumes stored in the data storage system and/or may store parity partitions along with partitions for at least some of the volumes stored in the data storage system.

As discussed in more detail below, in some embodiments, parity data of a parity partition may be stored in a similar manner as volume data of a "main" partition of a data volume. For example, data durability guarantees that require replication and/or durable storage in mass storage devices of volume data may also be applied to parity data to ensure the parity data is durably stored in the data storage system.

While not explicitly shown in FIG. 1A, in some embodiments, a parity partition, such as parity partition 140 for volume 1 or parity partition 142 for volume 2 may be implemented across multiple nodes of a data storage system, such as multiple ones of nodes 104 through 112. In some embodiments, a control plane 150 of a data storage system may determine which nodes are assigned to host which partitions and/or parity partitions based on respective loads of the nodes, such as an amount of I/O load the respective nodes are currently experiencing or forecast to experience.

Furthermore, in some embodiments a control plane of a data storage system, such as control plane 150, may generate, or cause another node of the data storage system to generate, parity data for a parity partition of a volume. For example, to generate parity data for volume 1, the control plane may apply an erasure code, such as an XOR erasure code to volume data of partitions A(120), B(124), C(128), and D(132) to generate parity data for each of the partitions of volume 1. The control plane may further cause the parity data to be stored in node 112 which hosts the parity partition 140 for volume 1. In some embodiments, a control plane, such as control plane 150, may delegate to one or more of the nodes of the data storage system the task of applying the erasure code to the volume data of the partitions of the volume.

Additionally, the control plane 160, may coordinate with the respective nodes storing volume data for partitions of a volume in order to update parity data for the volume. For example, for a write request directed to an offset of a volume included in a particular one of the partitions of the volume such as partition A (120), the control plane may coordinate with the node 104 to generate updated parity data for the volume that is to be stored in node 112 which hosts parity partition 140. In some embodiments, generating the updated parity data may include reading volume data from a storage of node 104 (and/or mass storage devices to which volume data has been flushed from node 104) into a memory of node 104. Node 104 and/or the control plane may then apply an erasure code to the volume data and the write data for the segment. For example, the write may be addressed to a particular volume offset and length and the node 104 may read a segment of the partition corresponding to the particular volume offset and length into the memory of the node 104. The node 104 may further apply the erasure code to the volume data corresponding to the volume offset and length and to the write data included with the write. The node 104 and/or the control plane 150 may then cause the a parity data update generated by applying the erasure code along with a write number and sequence number to be sent to the parity partition 140 and stored at node 112. The node 112 storing the parity partition 140 may further recalculate a new parity for the volume data corresponding to the volume offset and length by reading previously stored parity data from one or more storages of the data storage system (e.g. a storage of the node hosting the parity partition and/or a mass storage device of a data storage sled) and may apply an erasure code to the prior parity data and the parity data update to calculate a new parity for the volume offset and length, wherein the new re-calculated updated parity data is then stored in the parity partition.

In response to a failure of any of the nodes 104, 106, 108, 110, or 112, or corruption of any of the volume partitions A (120), B (124), C (128), or D (132) the control plane 150 may reconstruct the failed or corrupted partition using the parity data included in parity partition 140 stored on node 112 and the volume data of the surviving partitions such as surviving ones of volume partitions A (120), B (124), C (128), or D (132).

Figure 1B:
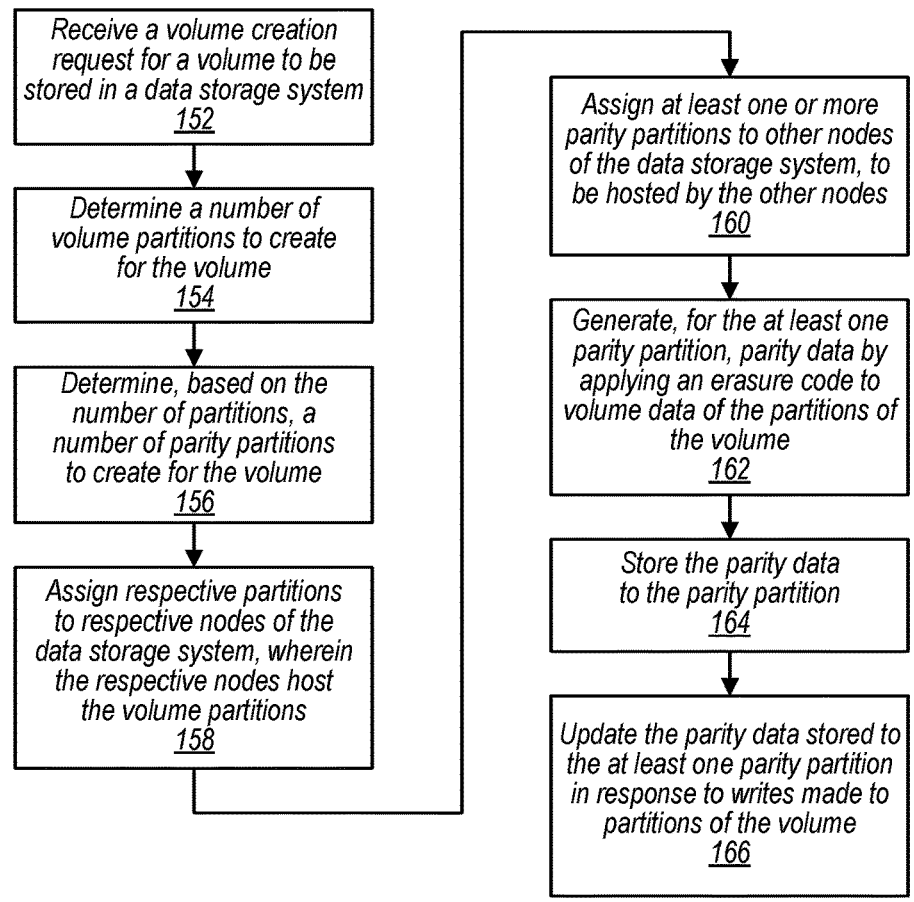
FIG. 1B illustrates a process for creating a volume in a data storage system, wherein the process includes creating multiple partitions for the volume and at least one parity partition for the volume, according to some embodiments.

FIG. 1B illustrates a process for creating a volume in a data storage system, wherein the process includes creating multiple partitions for the volume and at least one parity partition for the volume, according to some embodiments.

At 152, a control plane, such as control plane 150, receives a volume creation request for a volume to be stored/hosted in a data storage system, such as data storage system 102. In some embodiments, the control plane may be implemented by one or more of the nodes of the data storage system, such as one or more of nodes 104 through 112, or may be implemented on a separate computing device of the data storage system that implements a control plane for the data storage system.

At 154, the control plane determines a number of volume partitions to create for the volume. In some embodiments, the volume creation request may specify a number of partitions to create for the volume, or the volume creation request may not specify a number of partitions to create for the volume. If not specified, the control plane may determine a number of partitions to create for the volume based on one or more characteristics of the volume, such as an amount of data stored, or to be stored, in the volume, a frequency of I/O traffic directed at, or to be directed at, the volume or parts thereof, etc.

At 156, the control plane determines, based on the number of partitions to be created for the volume, a number of parity partitions to create for the volume. For example, in some embodiments, a control plane may apply one or more thresholds to determine a number of parity partitions to create for a volume. As an example, a control plane may assign a single parity partition for volume with less than X partitions and may assign an additional parity partition to the volume if the number of partitions exceeds X+Y, as an example. Also, as more partitions are created for the volume the control plane may further assign additional parity partitions to the volume.

At 158, the control plane assigns different ones of the partitions to different ones of the nodes of the data storage system, wherein the assigned nodes are configured to host the respective assigned partitions.

At 160, the control plane assigns the one or more parity partitions to other nodes of the data storage system, wherein the other nodes are configured to host the one or more parity partitions. In some embodiments, a control plane may ensure that parity partitions for a volume are assigned to a node that does not also host a partition for the volume. In this way, the data storage system may reduce the risk that a node failure will cause simultaneous loss of a parity partition and "main" partition for the same volume.

At 162, the control plane, the nodes hosting the partitions, and/or the node hosting the parity partition generates parity data for the volume. The parity data may be generated by applying an erasure code, such as an XOR erasure code, to volume data of the volume included in the various "main" partitions of the volume.

At 164, the control plane may further cause the generated parity data to be stored to the parity partition created for the volume and assigned to one of the "other" nodes of the data storage system.

At 166, the control plane and/or the respective nodes of the data storage system may update the parity data stored to the parity partition in response to changes made to the volume data of the volume hosted by the "main" partitions of the volume. For example, FIG. 2 discusses in more detail an example process for updating parity data of a parity partition in response to a change made to volume data of a volume.

Figure 2:
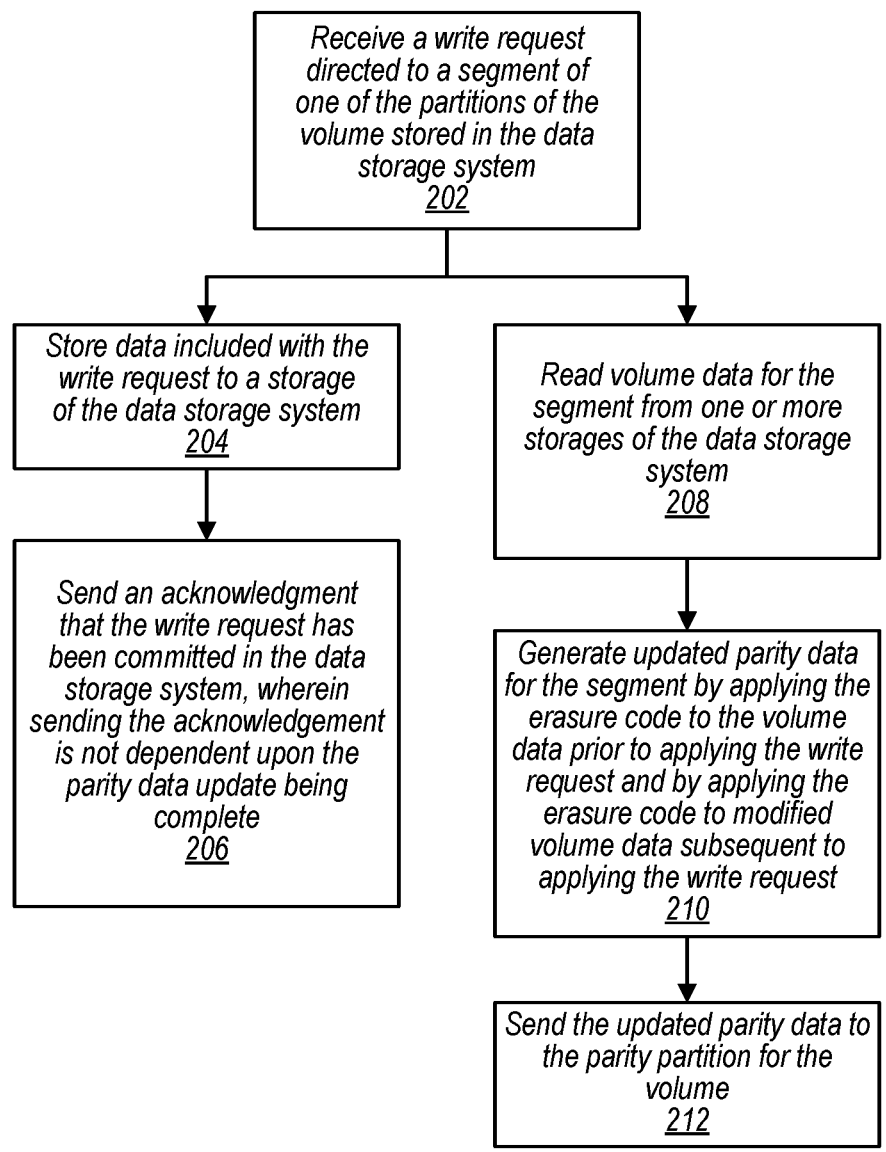
FIG. 2 illustrates a process for maintaining updated parity data for a parity partition for a volume stored in a data storage system, according to some embodiments.

FIG. 2 illustrates a process for maintaining updated parity data for a parity partition for a volume stored in a data storage system, according to some embodiments.

At 202, a modification request, such as a write request, is received by a data storage system. In some embodiments, the write request may be received directly by a node hosting a partition including a segment of the volume to which the write request is directed. In other embodiments, a control plane may receive the write request and route the write request to an appropriate node hosting a partition that includes the segment of the volume to which the write request is directed.

As part of a first thread, a series of steps may be taken to commit the write in the data storage system, such as steps 204 and 206. Also, as part of a second thread that is performed asynchronously from steps 204 and 206, and upon which steps 204 and 206 do not depend, steps may be taken to update the parity data stored for the volume to reflect the modification included with the write request received at 202.

For example, at 204 a node hosting a partition that includes a segment of the volume, such as a given offset X and length Y, to which the write request is directed may store data included with the write request to a storage of the node. In some embodiments, the node hosting the partition to which the write request is directed may implement a log-based storage and the write data may be added to an end of the log and an index for the log may be updated to indicate that the most recent data for the particular segment is located at a particular location in the log.

At 206, once it has been confirmed that the write data has been stored in the data storage system, the node hosting the partition and/or the control plane may send an acknowledgement to the requestor that the write request has been committed in the data storage system. In some embodiments, a data storage system may store a primary replica and a secondary replica of each partition, in which case the data storage system may send the acknowledgement in response to determining the write has been applied/stored to the first and second replica of the partition. Note that the data storage system is not required to wait for the parity partition data to be updated before sending the acknowledgement at 206.

As part of a second, separate thread to update the parity data, at 208, the data storage system may read volume data for the volume from one or more storages of the data storage system. For example, the data storage system may read volume data for the segment being modified from a log-based storage of a primary node hosting the partition that includes the segment to which the write was directed. The data storage system may also, if appropriate, read volume data for the segment from one or more mass storage devices of the data storage system. For example, in some embodiments, write data for a volume and/or volume partition may initially be stored in a primary node and/or replicated to a secondary node for the volume partition. In such embodiments, once one or more flush triggers have been met, the primary node may cause volume data, such as data associated with previously received write requests to be flushed to one or more mass storage devices of the data storage system. If a portion, or all, of the volume data for the segment to which the write request is directed has been flushed to the mass storage devices, in place of, or in addition to, reading the volume data from the node hosting the volume partition, the data storage system may also read volume data for the segment from one or more of the mass storage devices of the data storage system. Note that because the nodes of the data storage system may include log-based storages, the nodes may store the latest write data included with the write request and also store other data for the segment that represents a version of the segment prior to the write request being applied to the segment.

In some embodiments, a control plane and/or node of the data storage system may apply an erasure code to the data read at 208 and to the data included with the write request to generate an erasure coded version of the data for the segment, which may be referred to herein as a parity data update. For example, an XOR erasure code may be applied to the read data and the write data to generate the parity data update.

For example at 210, the control plane and/or node of the data storage system may generate a parity data update for the segment by applying an erasure code to the volume data read at 208 and the write data, wherein the read data and the write data are inputs to the erasure code and the parity data update is an output of the erasure code. In some embodiments, a parity data update may include a write number for the write, and/or a sequence number for a current membership of nodes servicing the partition.

At 212, the control plane and/or node of the data storage system may send the parity data update to a node hosting the parity partition, wherein the parity data update is added to the parity partition and used to calculate a new parity for the volume. As discussed above, in some embodiments a new parity may be calculated in response to each s parity data update received at the parity partition. In other embodiments, parity data updates may be stored, for example in a log-based storage of the node hosting the parity partition and may be played back to create a current state of the parity partition as part of a process of reconstructing the given partition of the volume. Also, in some embodiments, a parity partition may accumulate parity data updates for a volume and upon one or more thresholds or other triggers being met, the node hosting the parity partition and/or the control plane for the data storage system may cause new parity data to be calculated for the volume that reflects accumulated sets of parity data updates stored in the parity partition.

In some embodiments, to calculate a new parity, a second erasure code applied at the parity partition may take the parity data update and prior parity data read from the parity partition as inputs to the erasure code and may generate a new recalculated parity as an output of the erasure code. For example, an XOR erasure code may take inputs comprising the parity data update received from the node hosting the partition that was written to and prior parity data read from the storage of the parity partition node and/or mass storage devices of the data storage system and may generate an output comprising a recalculated parity for the segment of the partition that was written to, wherein the recalculated parity is then stored in the parity partition.

In some embodiments, generating a parity data update and recalculating a new parity may be performed at a node hosting a parity partition or may be performed between the node hosting the parity partition and a node hosting a volume partition that was written to. For example, a node hosting a partition that was written to may send volume data prior to the write and write data associated with the write to a node hosting the parity partition and the node hosting the parity partition may generate a parity data update by applying an erasure code to the received volume data prior to the write and the write data. The node hosting the parity partition may further calculate a new parity by applying an erasure code to the generated parity data update and prior parity data read from a storage for the parity partition. However, in some embodiments, generating the parity data update may alternatively be performed by a node hosting the partition that was written to. Thus in some embodiments, a node hosting a "main" volume partition may commit a write, acknowledge the write, and asynchronously generate a parity data update to send to a node hosting a partition. The node hosting the parity partition may then use previously stored parity data and the parity data update to calculate a new parity for the volume partition that was written to.

Figure 3:
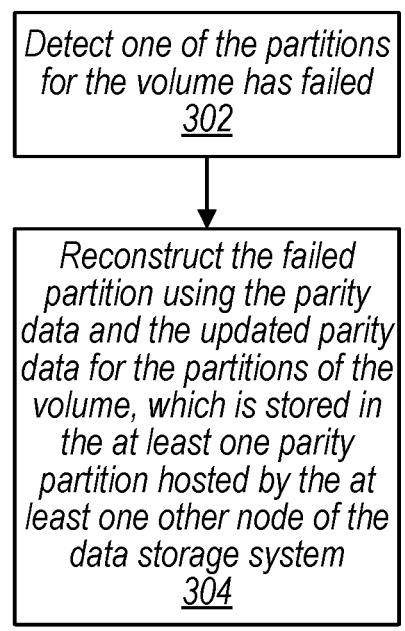
FIG. 3 illustrates a process for reconstructing a failed partition of a volume stored in a data storage system using parity data of a parity partition for the volume, according to some embodiments.

FIG. 3 illustrates a process for reconstructing a failed partition of a volume stored in a data storage system using parity data of a parity partition for the volume, according to some embodiments.

At 302, a control plane of a data storage system detects one or more failed partitions of a volume stored in the data storage system. In some situations the failed partition may have become corrupted, or the node hosting the failed partition may have become unresponsive or otherwise failed.

At 304, the control plane causes a replacement partition for the failed partition to be reconstructed and hosted by another surviving node of the data storage system. Thus a loss of a whole partition of the volume can be recovered from without the volume being lost. In order to reconstruct the failed partition, the control plane may utilize the parity data stored for the failed partition in the parity partition and volume data of other partitions of the volume that have not failed or become corrupted As part of reconstructing the failed partition, the control plane may verify that a write number for a latest write committed in the data storage system for the failed partition corresponds to a latest write number included with updated parity data stored to the parity partition. In some embodiments, if the write numbers do not match, the control plane may refrain from reconstructing the failed partition for a period of time such that a parity data update sent to the parity partition with a most recent write number can be committed in the parity partition and used to calculate a new parity for the a segment of the parity partition FIG. 4 is a block diagram illustrating nodes and data storage sleds of a data storage system, wherein, to create a volume in the data storage system, a control plane of the data storage system assigns different partitions of the volume to different ones of the nodes and also assigns a parity partition to at least one of the nodes of the data storage system, according to some embodiments.

Figure 4:
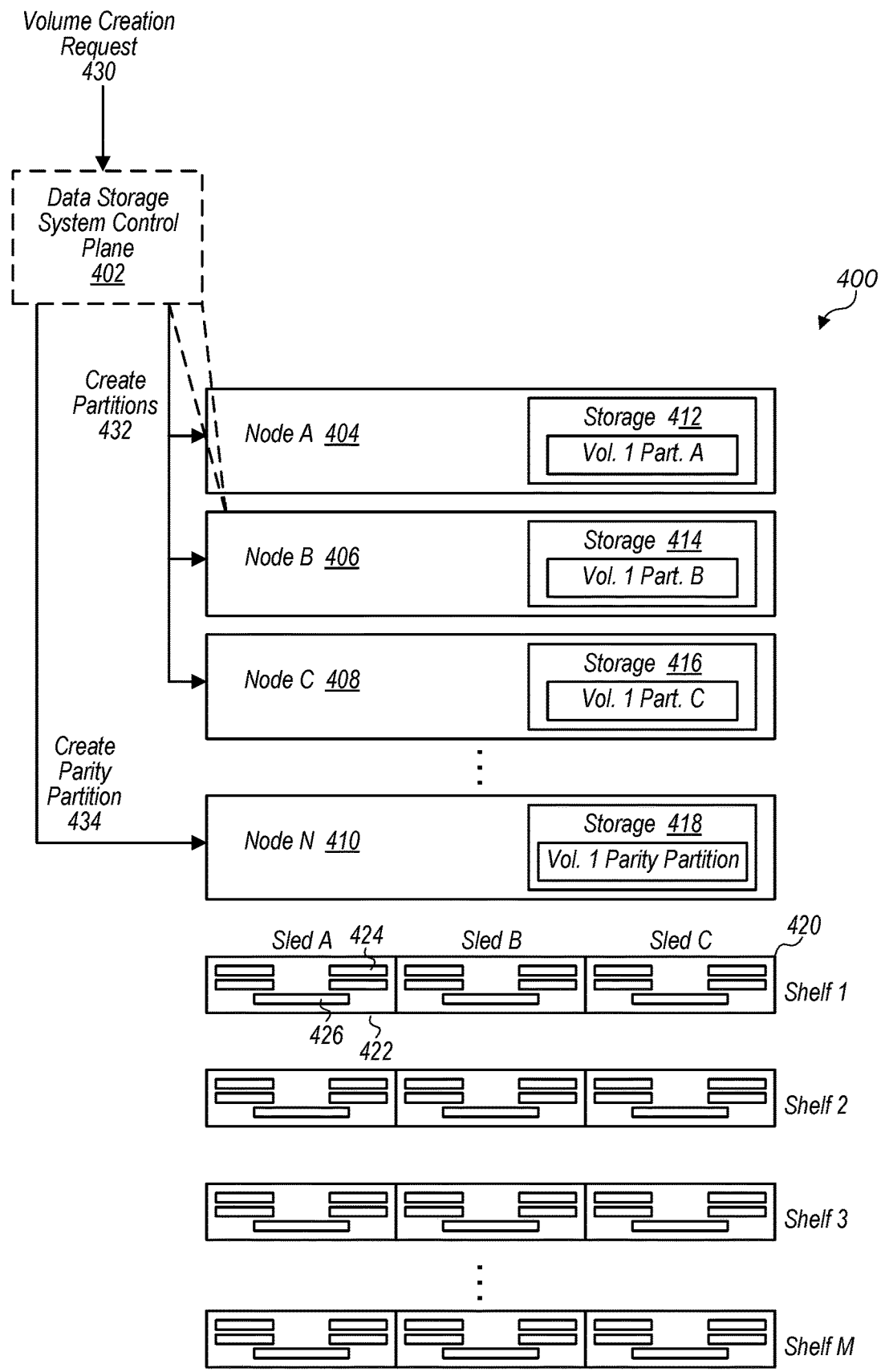
FIG. 4 is a block diagram illustrating nodes and data storage sleds of a data storage system, wherein, to create a volume in the data storage system, a control plane of the data storage system assigns different partitions of the volume to different ones of the nodes and also assigns a parity partition to at least one of the nodes of the data storage system, according to some embodiments.
Figure 5:
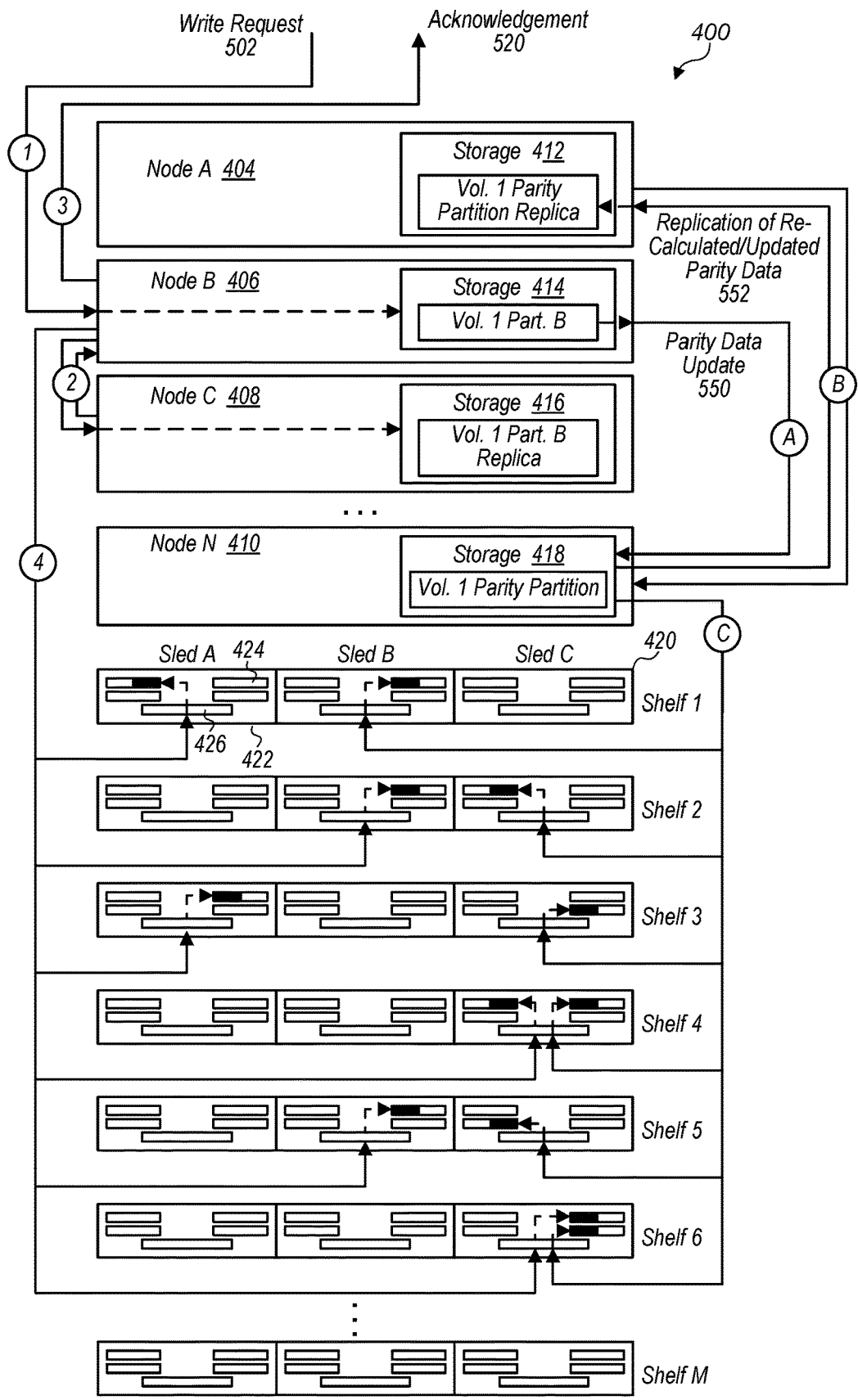
FIG. 5 is a block diagram illustrating nodes and data storage sleds of a data storage system storing block storage data in response to a write request directed to a segment of a volume stored in the data storage system and further updating parity data of a parity partition for the volume maintained by the data storage system, according to some embodiments.

In some embodiments, a data storage system, such as data storage system 102 illustrated in FIG. 1A, may further include sleds comprising mass storage devices, as shown in FIGS. 4 and 5.

In some embodiments, a data storage system, such as data storage system 400, may include multiple nodes that each include a respective storage. In some embodiments, the nodes may implement a log-based storage. For example, data storage system 400 includes node A (404), node B (406), node C (408), and node N (410), wherein "N" may be any number of nodes. Additionally, node A (404) includes log-based storage 412, node B (406) includes log-based storage 414, node C (408) includes log-based storage 416, and node N (410) includes log-based storage 418. In some embodiments, data storage sleds 422 are included in a data storage unit of data storage system 400 along with node A (404), node B (406), node C (408), and node N (410) of the data storage unit. In some embodiments, the data storage sleds are mounted on shelves of a data storage unit and each include mass storage devices 424 and sled controller 426.

In some embodiments, one or more of the nodes of the data storage system, such as node B (406), may implement a control plane 402 for the data storage system. In some embodiments, an incoming volume creation request 430 may be routed to control plane 402. The control plane 402 may determine a number of "main" partitions and parity partitions to create for the requested volume and may further assign the "main" partitions and parity partitions to respective ones of the nodes of the data storage system. For example, the control plane 402 may send instructions 432 to respective ones of the nodes, such as nodes A (404), B (406), and C (408) to host partitions for the volume. Additionally, the control plane 402 may send instructions to another node of the data storage system, such as node N (410) to host a parity partition for the volume.

In some embodiments, control plane 402 may issue a sequence number to a set of nodes hosting a primary replica and a secondary replica for a given partition.

In some embodiments, a data storage system may include multiple racks in which nods and data storage sleds are mounted. In some embodiments, partitions and parity partitions for a volume may be stored in nodes and data storage sleds all mounted in a same rack, or may be stored in nodes and/or data storage sleds mounted in different racks.

Note that in some embodiments, each partition (e.g. each of volume 1 partition A, volume 1 partition B, volume 1 partition C, and volume 1 parity partition) may be stored on a primary node and a corresponding replica of the respective partition may be stored on a secondary node. However, for ease of illustration, only the primary replicas are shown in FIG. 4.

FIG. 5 is a block diagram illustrating nodes and data storage sleds of a data storage system storing block storage data in response to a write request directed to a segment of a volume stored in the data storage system and further updating parity data of a parity partition for the volume maintained by the data storage system, according to some embodiments.

Nodes A (404), B (406), and C (408) illustrated in FIG. 5 may be the same as nodes A (404), B (406), and C (408) illustrated in FIG. 4. Also, data storage sleds 422 may be the same as data storage sleds 422 illustrated in FIG. 4.

As discussed above, a data storage system may store volume data in a data storage of a first node designated as a primary node for a volume partition and may also replicate the volume data to a second node designated as a secondary node for the volume partition. For example, at time 1, a write request 502 is routed to node B (406) that is designated as a primary node for partition B of volume 1. At time 2 subsequent to the write request being received at node B (406), data included with the write request is stored in storage 414 of primary node 406 and primary node 406 causes the data included with the write request to be replicated to storage 416 of secondary node 408. Replication of the data to secondary node 408 is performed concurrently or nearly concurrently with storing the data in storage 414 of primary node 406. Also, as shown in FIG. 5 at time 2, replication of the data to the secondary node may include the secondary node sending an acknowledgment back to the primary node indicating that the data has been replicated to the secondary node. Subsequently at time 3, which is also nearly concurrent with the data being stored in the storage of the primary node and the data being replicated to the secondary node, the primary node, node 406, may issue an acknowledgement 520 to the client device that requested write 502 has been committed in data storage system 400.

In some embodiments, a write request, such as write request 502, may be concurrently received at a primary node and a secondary node. In such embodiments, the primary node may verify that the secondary node has committed the write before acknowledging at time 3 that the write has been committed in the data storage system.

Additionally, in response to receiving the write request, updated parity data for partition B may be asynchronously generated and stored to the parity partition for volume 1 hosted by node 410. Note that the acknowledgement 520 of the write being committed in data storage system 400 may not be dependent upon the parity data update being completed, thus the data storage system does not have to wait for the parity data update to be completed before sending acknowledgement 520. This may improve write latency as compared to waiting for the parity data update to complete.

In order to update the parity data, node B (406) may generate a parity data update by applying an erasure code the write data and to a version of a segment of the volume data before applying the write. Additionally, node B (406) may include a write number and sequence number with the parity data update. At time A the node B (406) may send parity data update 550 to node N (410) which hosts the primary parity partition for volume 1. The node N (410) may calculate a new parity for the parity partition by applying an erasure code to the parity data update and previously stored parity data for the segment. At time B, node N (410) may replicate the recalculated/updated parity data (552) to node A (404) which hosts a secondary replica of the parity partition. In some embodiments, node A (404) may send an acknowledgement back to node N (410) that the recalculated/updated parity data has been replicated to the secondary replica of the parity partition.

At a later point in time 4, e.g. asynchronous to times 1-3, the primary node, for volume 1 partition B e.g. node 406, may cause data stored in storage 414, that includes the data included with the write request and that may include additional data stored before or after the write request, to be flushed to mass storage devices 424 of the data storage sleds 422 of the data storage system. For example, at time 4 data is flushed to mass storage devices 424 of data storage sleds 422. In some embodiments, data is divided into portions and stored across multiple mass storage devices, each in a different sled and/or on a different shelf of a data storage unit. In some embodiments, data is also erasure encoded when stored in mass storage devices of data storage sleds. For example, data flushed from storage 414 of node 406 may be divided into six portions where each portion is stored in a different mass storage device of a different data storage sled on a different shelf of a data storage unit of data storage system 400 and is also erasure encoded across the different mass storage devices. For example data portions are stored in sled A of shelf 1, sled B of shelf 2, sled A of shelf 3, sled C of shelf 4, sled B of shelf 5, and sled C of shelf 6.

Also, as can be seen in FIG. 5, a data storage unit may include "M" number of shelves and "N" number of nodes. The portions of data may be stored on portions of mass storage devices 424 in the respective data storage sleds 422. In order to distinguish between a portion of data and a portion of space on a mass storage device, a portion of space on a mass storage device may be referred to herein as a "column" of a mass storage device. Furthermore, a set of columns of mass storage devices that store different portions of data of a volume such as the columns shown in sled A of shelf 1, sled B of shelf 2, sled A of shelf 3, sled C of shelf 4, sled B of shelf 5, and sled C of shelf 6 may collectively make up what is referred to herein as an "extent." For example, in an erasure encoded RAID six array, an extent may include six columns that collectively make up the RAID array. Four of the columns may store striped data and two of the columns may store parity data. In some embodiments, other replication algorithms other than erasure encoding may be used such as quorum algorithms, etc.

In some embodiments, each column of an extent may be in a different fault domain of a data storage unit. For example, for the extent being stored in FIG. 5 each column is located in a different data storage sled that is mounted on a different shelf of the data storage unit. Thus a failure of a sled controller, such as one of sled controllers 426, may only affect a single column. Also if a power supply of a data storage sled fails it may only affect a single data storage sled or if a part of a power distribution system fails it may affect a single shelf. However, because each column of an extent may be located in a different shelf, a shelf level power event may only affect a single column of the extent.

In some embodiments, a node of a data storage unit, such as one of nodes 404, 406, 408, or 410, may implement a local control plane. The local control plane may further implement an extent allocation service that allocates extents to nodes designated as a primary node for a volume or volume partition. In some embodiments, an extent allocation service may allocate a set of extents to a particular volume referred to herein as a "sandbox." The primary node for the particular volume may then select extents to store data on during a data flush from the primary node to data storage sleds of the data storage unit by selecting an extent from the sandbox allocated for the particular volume.

In some embodiments, if insufficient space is available in the particular volume's sandbox or if a particular placement would cause a data durability of data to be saved to fall below a minimum required durability for the particular volume, a primary node for the particular volume may select columns outside of the particular volume's sandbox to write data for the particular volume. For example, a sandbox may include multiple columns that make up multiple extents in different ones of the data storage sleds 426 on different ones of the shelves of a data storage unit. A primary node may be able to flush data to columns within a particular volume's sandbox without having to request extent allocation from a local control plane that implements an extent allocation service. This may further add durability and reliability to a data storage unit because a primary node for the particular volume may continue to flush data even if communication is lost with a local control plane within the data storage unit. However, if space is not available or a placement would cause durability for a particular volume or volume partition to fall below a minimum threshold, a primary node may flush data to columns outside of the particular volume's sandbox. In some embodiments, a primary for a particular volume may flush data to columns outside the primary node's sandbox without requesting an allocation from a local control plane that implements an extent allocation service. For example, a primary node may store addresses for each sled controller in a data storage unit and may flush data to any sled controller in the data storage unit that is associated with mass storage devices with available columns.

Because for a particular volume, the volume's data may be stored in a storage of a primary node and replicated to a secondary node and may later be moved to being stored across an extent of mass storage devices in different data storage sleds of a data storage unit, an index with pointers to where the data is stored may be used for subsequent read requests and write requests to locate the data. Also in some embodiments, storages of a node may be log-structured such that incoming write request are written to the head of the log of the node's log-structured storage. An index entry may be added indicating where the written data is stored in the node's log and subsequently the index may be updated when the written data is flushed from the log of the primary node to an extent comprising columns of mass storage devices of the data storage system.

In a similar manner as the volume data described above, the parity data for the volume may also be flushed to a set of mass storage devices of a data storage system. Also, the parity data may further be erasure encoded when flushed to the data storage sleds. For example, at time C parity data of the volume 1 parity partition may be erasure encoded and stored to sled B of shelf 1, sled C of shelf 2, sled C of shelf 3, sled C of shelf 4, sled C of shelf 5, and sled C of shelf 6.

Also, in some embodiments, parity data updates for multiple partitions may be concurrently sent to a parity partition for the volume. For example, node 410 may concurrently receive a parity data update for volume 1 partition B and also for volume 1 partition A. The parity partition may store the respective parity data updates to a log-based storage of the parity partition and may further use the stored parity data updates to calculate a new parity for the parity partition. The new parity may be used to reconstruct failed one of partition A or partition B of volume 1, in response to a failure of partition A or partition B of volume 1. In some embodiments, parity data that is needed to perform a reconstruction, may have been flushed to the data storage sleds, in which case the node hosting the parity partition, such as node 410, may read the flushed parity data/parity data updates from the sleds in order to reconstruct the failed partition.

Figure 6A:
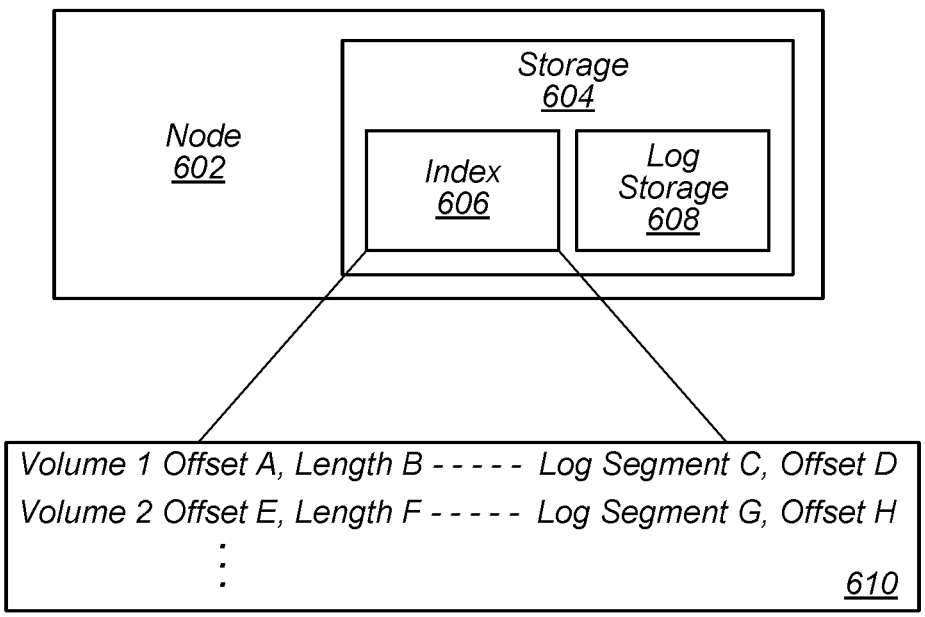
FIGS. 6A-6B are block diagrams illustrating a log storage and index of a storage of a node of a data storage system, according to some embodiments.
Figure 6B:
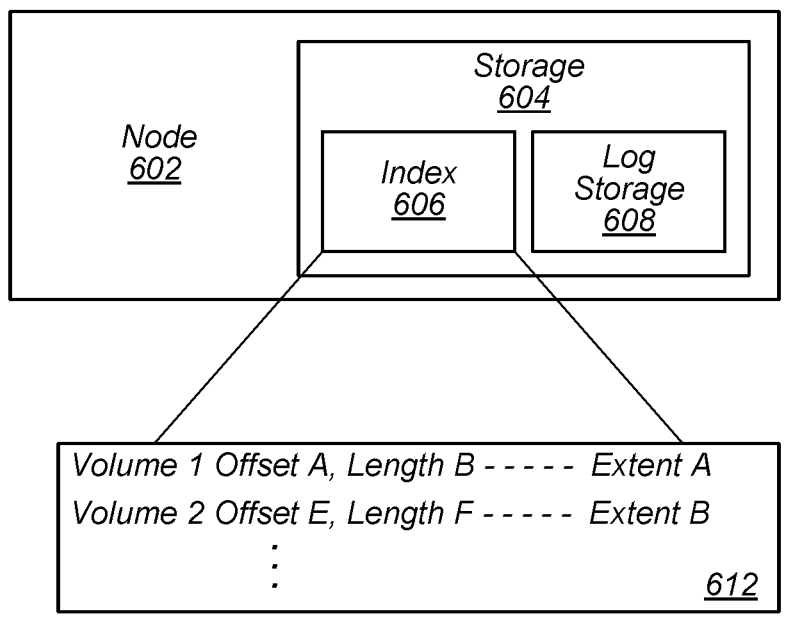

FIGS. 6A-6B are block diagrams illustrating a log-structured storage and an index of a node storage, according to some embodiments. Node 602 includes storage 604 that includes log 608 and index 606. Volume data may be stored in log 608 prior to being flushed to mass storage devices of a data storage unit. Index information 610 may include an entry for the volume data and a corresponding pointer to where the volume data is stored. For example, index information 610 indicates that data for volume 1, offset A, length B is stored in log storage 608 at log segment C and offset D. In some embodiments, a log of a node such as log 608 of storage 604 of node 602 may store data for more than one volume. For example, index information 610 also includes an entry for volume 2 offset E, length F and a corresponding pointer indicating the data for this volume entry is stored in log 608 at log segment G, offset H.

While FIGS. 6A-6B illustrate log storage 608 and index 606 as separate from each other, in some embodiments, an index, such as index 606, may lay on top of a log or side-by-side with a log, such as log storage 608.

When data for a volume partition or parity data for a volume is moved from a storage of a node to being stored in an extent across multiple mass storage devices of a data storage unit, the volume data/parity data may be removed from a log of a node storage and an index of the node storage may be updated to indicate the new location at which the data/parity data for the volume is stored. For example, in FIG. 6B, index information 612 indicates that data for volume 1, offset A, length B is now stored at extent A and data for volume 2, offset E, length F is now stored at extent B. Note that the labels "extent A" and "extent B" are used for ease of illustration. In some embodiments, an index may include addresses of data storage sleds where the data for the volume is located, such as local IP addresses of the data storage sleds, and addresses of the columns of the mass storage devices within the data storage sleds. In some embodiments, an index may include another label such as "extent A" where each node stores information for locating "extent A" or may consult an extent allocation service for locating "extent A." In some embodiments, an index may include addresses of data storage sleds where the data for the volume is located and sled controllers of the data storage sleds may be able to determine the appropriate columns based on volume IDs stored in respective columns allocated to the volume.

When a read request is received by a node designated as a primary node for a volume, the node may consult an index of a storage of the node, such as index 606 of storage 604, to determine what is the latest version of the volume's data and where the latest version of the volume's data is stored. For example a primary node, such as node 602, may consult the primary node's index, such as index 606, to determine if the latest version of the volume's data is stored in the node's log, such as log 608, or is stored in an extent comprising mass storage devices of the data storage unit.

In some embodiments, a data storage system, such as data storage system 100 and/or 400, may be part of a larger provider network system. Also, in some embodiments more than one data storage unit may be included in a block storage service of a provider network. For example, FIG. 7 illustrates such an example provider network, according to some embodiments.

Figure 7:
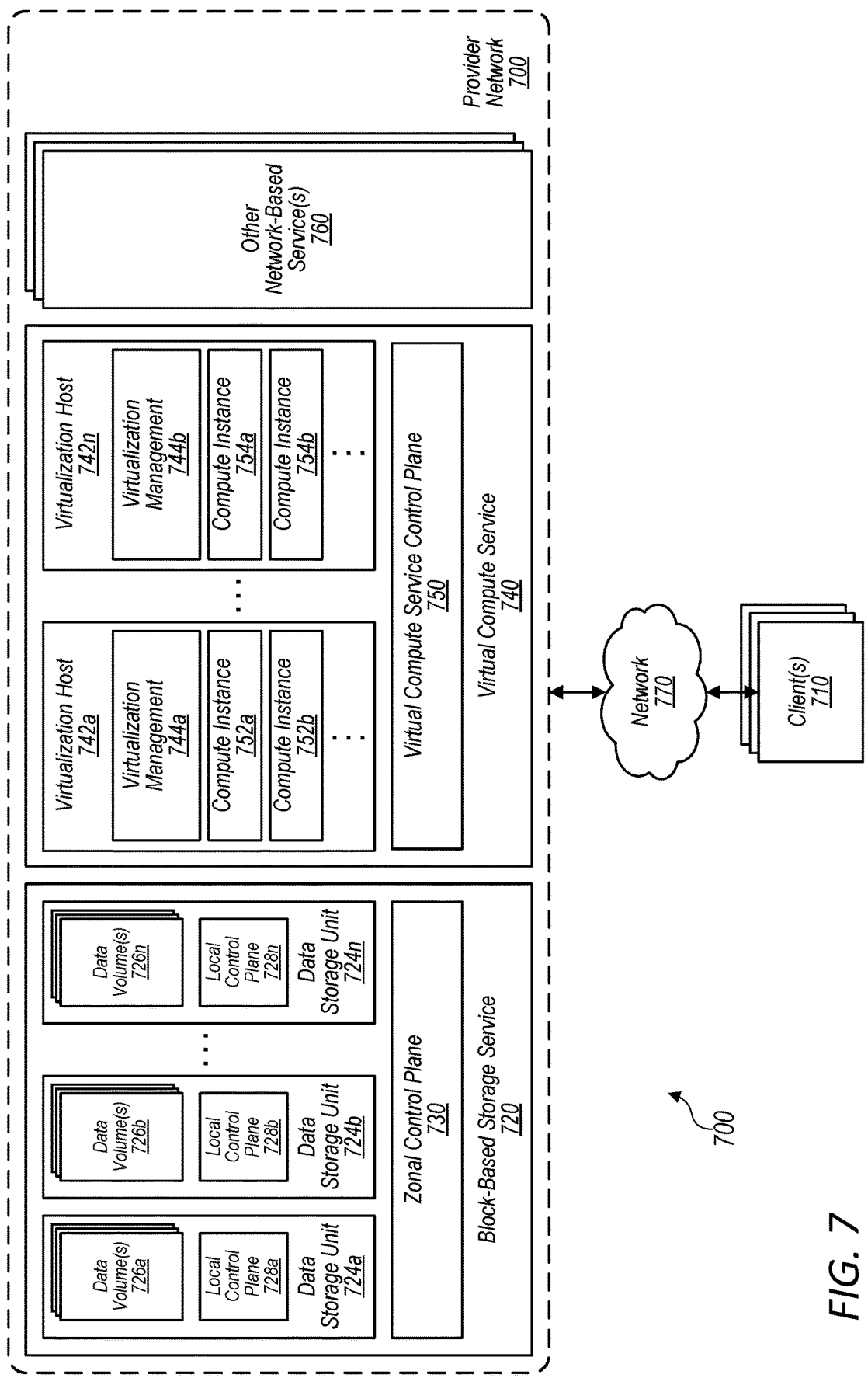
FIG. 7 is a block diagram illustrating a provider network implementing multiple network-based services including a block-based storage service that implements partition level parity data, according to some embodiments.

FIG. 7 is a block diagram illustrating a provider network implementing multiple network-based services including a block-based storage service that implements partition level parity data, according to some embodiments.

Provider network 700 may be set up by an entity such as a company or a public sector organization to provide one or more services (such as various types of cloud-based computing or storage) accessible via the Internet and/or other networks to clients 710. Provider network 700 may include numerous data centers hosting various resource pools, such as collections of physical and/or virtualized computer servers, storage devices, networking equipment and the like (e.g., computing device 1000 described below with regard to FIG. 10), needed to implement and distribute the infrastructure and services offered by the provider network 700. In some embodiments, provider network 700 may provide computing resources, such as virtual compute service 740, storage services, such as block-based storage service 720, and/or any other type of network-based services 760. Clients 710 may access these various services offered by provider network 700 via network 770. Likewise network-based services may themselves communicate and/or make use of one another to provide different services. For example, computing resources offered to clients 710 in units called "instances," such as virtual or physical compute instances, may make use of particular data volumes 726, providing virtual block-based storage for the compute instances. Also, note that any of the data storage units 724a, 724b, 724n may be data storage systems such as data storage systems 102 illustrated in FIG. 1 and/or data storage system 400 illustrated in FIGS. 4 and 5.

As noted above, virtual compute service 740 may offer various compute instances, such as compute instances 754a and 754b to clients 710. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 740 in different embodiments, including special purpose computer servers, storage devices, network devices and the like. In some embodiments instance clients 710 or any other user may be configured (and/or authorized) to direct network traffic to a compute instance. In various embodiments, compute instances may mount, connect, attach or map to one or more data volumes 726 provided by block-based storage service 720 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 710 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 7, a virtualization host, such as virtualization hosts 742a and 742n, may implement and/or manage multiple compute instances 752a, 752b, 754a, and 754b respectively, in some embodiments, and may be one or more computing devices, such as computing device 1000 described below with regard to FIG. 10. Virtualization hosts 742 may also provide multi-tenant hosting of compute instances. For example, in some embodiments, one virtualization host may host a compute instance for one entity (e.g., a particular client or account of virtual computing service 710), while another compute instance hosted at the same virtualization host may be hosted for another entity (e.g., a different account). A virtualization host may include a virtualization management module, such as virtualization management modules 744a and 744b capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 740 may implement control plane 750 to perform various management operations. For instance, control plane 750 may implement resource management to place compute instances, and manage the access to, capacity of, mappings to, and other control or direction of compute instances offered by provider network. Control plane 750 may also offer and/or implement a flexible set of resource reservation, control and access interfaces for clients 710 via an interface (e.g., API). For example, control plane 750 may provide credentials or permissions to clients 710 such that compute instance control operations/interactions between clients and in-use computing resources may be performed. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various embodiments, control plane 750 may track the consumption of various computing instances consumed for different virtual computer resources, clients, user accounts, and/or specific instances. In at least some embodiments, control plane 750 may implement various administrative actions to stop, heal, manage, or otherwise respond to various different scenarios in the fleet of virtualization hosts 742 and instances 752, 754. Control plane 750 may also provide access to various metric data for client(s) 710 as well as manage client configured alarms.

In various embodiments, provider network 700 may also implement block-based storage service 720 for performing storage operations. Block-based storage service 720 is a data storage system, composed of one or more computing devices implementing a zonal control plane 730 and a pool of multiple data storage units 724a, 724b through 724n (e.g., data storage units such as data storage unit 102 illustrated in FIG. 1 or data storage unit 400 illustrated in FIGS. 4 and 5), which provide block level storage for storing one or more sets of data volume(s) 726a, 726b through 726n. Data volumes 726 may be attached, mounted, mapped, or otherwise connected to particular clients (e.g., a virtual compute instance of virtual compute service 740), providing virtual block-based storage (e.g., hard disk storage or other persistent storage) as a contiguous set of logical blocks. In some embodiments, a data volume 726 may be divided up into multiple data chunks or partitions (including one or more data blocks) for performing other block storage operations, such as snapshot operations or replication operations. A volume snapshot of a data volume 726 may be a fixed point-in-time representation of the state of the data volume 726. In some embodiments, volume snapshots may be stored remotely from a data storage unit 724 maintaining a data volume, such as in another storage service 760. Snapshot operations may be performed to send, copy, and/or otherwise preserve the snapshot of a given data volume in another storage location, such as a remote snapshot data store in other storage service 760. In some embodiments, a block-based storage service, such as block-based storage service 720, may store snapshots of data volumes stored in the block-based storage service.

Block-based storage service 720 may implement zonal control plane 730 to assist in the operation of block-based storage service 720. In various embodiments, zonal control plane 730 assists in creating volumes on data storage units 724a, 724b, through 724n and moving volumes between data storage units 724a, 724b, through 724n. In some embodiments, access to data volumes 726 may be provided over an internal network within provider network 700 or externally via network 770, in response to block data transaction instructions.

Zonal control plane 730 may provide a variety of services related to providing block level storage functionality, including the management of user accounts (e.g., creation, deletion, billing, collection of payment, etc.). Zonal control plane 730 may implement capacity management, which may generate and manage a capacity model for storage service 720, and may direct the creation of new volumes on particular data storage units based on the capacity of storage service 720. Zonal control plane 730 may further provide services related to the creation and deletion of data volumes 726 in response to configuration requests. Additionally, zonal control plane 730 may further manage creating parity partition(s) for a volume and updating parity data stored in a parity partition for a volume. Also, in some embodiments, updating parity partition data may be performed by a local control plane.

Clients 710 may encompass any type of client configured to submit requests to network provider 700. For example, a given client 710 may include a suitable version of a web browser, or may include a plug-in module or other type of code module configured to execute as an extension to or within an execution environment provided by a web browser. Alternatively, a client 710 may encompass an application such as a database application (or user interface thereof), a media application, an office application or any other application that may make use of compute instances, a data volume 726, or other network-based service in provider network 700 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 710 may be configured to generate network-based services requests according to a Representational State Transfer (REST)-style network-based services architecture, a document- or message-based network-based services architecture, or another suitable network-based services architecture. In some embodiments, a client 710 (e.g., a computational client) may be configured to provide access to a compute instance or data volume 726 in a manner that is transparent to applications implemented on the client 710 utilizing computational resources provided by the compute instance or block storage provided by the data volume 726.

Clients 710 may convey network-based services requests to provider network 700 via external network 770. In various embodiments, external network 770 may encompass any suitable combination of networking hardware and protocols necessary to establish network-based communications between clients 710 and provider network 700. For example, a network 770 may generally encompass the various telecommunications networks and service providers that collectively implement the Internet. A network 770 may also include private networks such as local area networks (LANs) or wide area networks (WANs) as well as public or private wireless networks. For example, both a given client 710 and provider network 700 may be respectively provisioned within enterprises having their own internal networks. In such an embodiment, a network 770 may include the hardware (e.g., modems, routers, switches, load balancers, proxy servers, etc.) and software (e.g., protocol stacks, accounting software, firewall/security software, etc.) necessary to establish a networking link between given client 710 and the Internet as well as between the Internet and provider network 700. It is noted that in some embodiments, clients 710 may communicate with provider network 700 using a private network rather than the public Internet.

Figure 8:
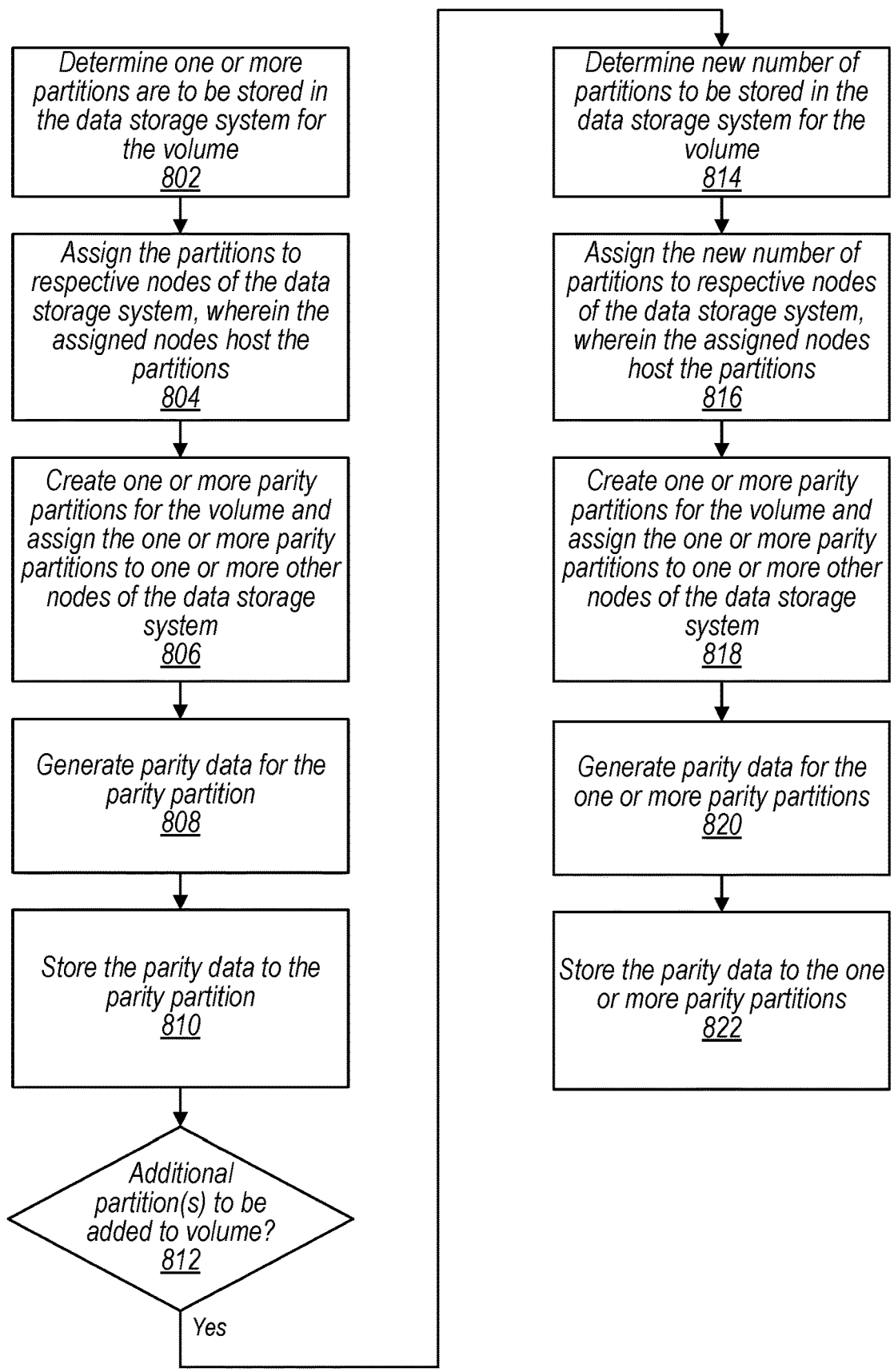
FIG. 8 illustrates a process for determining a number of partitions to create for a volume stored in a data storage system and further determining a number of parity partitions to create for the volume, according to some embodiments.

FIG. 8 illustrates a process for adding partitions to a volume stored in a data storage system and further determining whether to add additional parity partitions for the volume, according to some embodiments.

At 802, a control plane of a data storage system, such as control plane 150 of data storage system 102 illustrated in FIG. 1 or control plane 402 of data storage system 400 illustrated in FIGS. 4 and 5, may determine one or more partitions are to be stored in the data storage system for a volume. For example, the number of partitions to be stored for the volume may be determined based on a size of the volume or an amount of I/O traffic directed at the volume, as a few examples.

At 804, the control plane may assign the one or more partitions to respective nodes of the data storage system, wherein the assigned nodes host the partitions.

At 806, the control plane may create one or more parity partitions for the volume and assign the one or more parity partitions to "other" nodes of the data storage system, wherein the other "other" nodes are configured to host the one or more parity partitions.

At 808, the control plane may cause parity data to be generated for the one or more parity partitions and may further cause the parity data for the one or more parity partitions to be stored to the one or more parity partitions.

At 810, the control plane causes the parity data to be stored to the one or more parity partitions.

At 812, the control plane of the data storage system determines if one or more additional (or fewer) partitions are to be stored in the data storage system for the volume. For example, the size of the volume may have increased (or decreased) or an amount of I/O traffic directed at the volume may have increased (or decreased) such that an additional partition is to be added (or removed) from the data storage system for the volume.

If so, at 814, the control plane of the data storage system may determine a new number of partitions to be stored in the data storage system for a volume.

At 816, the control plane may assign the new number of partitions to respective nodes of the data storage system, wherein the assigned nodes host the partitions.

At 818, the control plane may create one or more parity partitions for the volume and assign the one or more parity partitions to one or more "other" nodes of the data storage system, wherein the one or more "other" nodes are configured to host the one or more parity partitions. For example, in some embodiments, a control plane may assign additional parity partitions based on a number of partitions stored for a volume exceeding a threshold. As a simple example, a control plane may store a single parity partition up to X partitions and then may add an additional parity partition for each Y partitions stored for the volume in excess of X, where X and Y are configurable parameters.

At 820, the control plane may cause parity data to be generated for the one or more parity partitions and may further cause the parity data for the one or more parity partitions to be stored to the one or more parity partitions.

At 822, the control plane causes the parity data to be stored to the one or more parity partitions.

Figure 9:
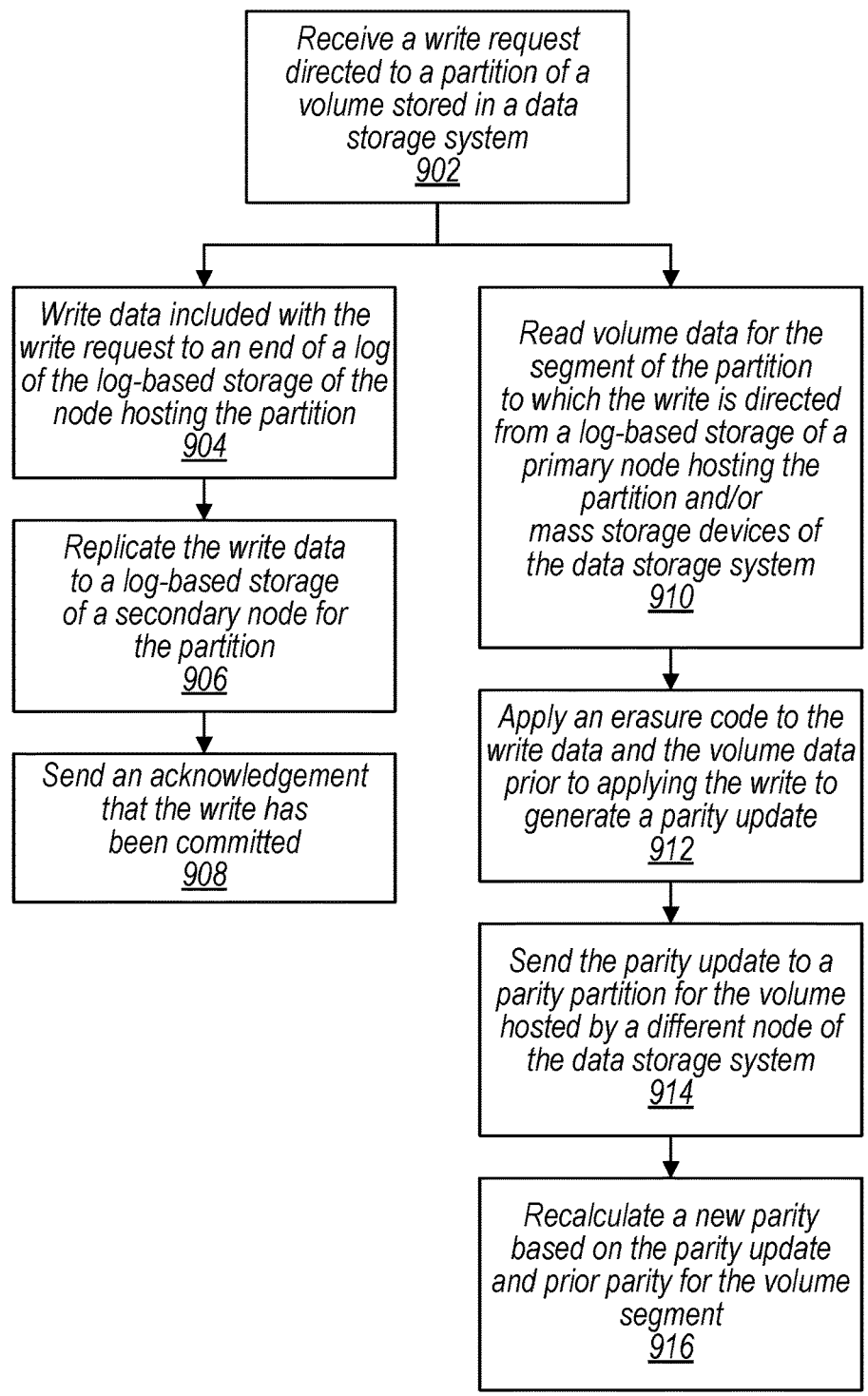
FIG. 9 illustrates a more detailed process for maintaining updated parity data for a parity partition for a volume stored in a data storage system, according to some embodiments.

FIG. 9 illustrates a more detailed process for maintaining updated parity data for a parity partition for a volume stored in a data storage system, according to some embodiments.

At 902, a node of a data storage system receives a write request directed to a partition of a volume stored in the data storage system.

At 904, the node writes data included in the write request to a log of a log-based storage of the node and updates an index of the log-based storage to indicate the location in the log where the write data has been stored.

At 906, the node causes the write data to be replicated to a secondary node hosting a secondary replica of the volume partition that is hosted by the first node. The secondary node also stores the write data to a log of a log-based storage of the secondary node and updates an index of the log-based storage to indicate the location in the log where the write data has been stored. Additionally, the secondary node sends a confirmation to the first node indicating that the replicated write data has been stored.

At 908, the first node sends an acknowledgment to the client that submitted the write request that the write has been committed in the data storage system.

Asynchronously, at 910 the first node and/or the control plane reads volume data for a segment of the volume to which the write request was directed from a log-based storage of the first node and/or from mass storage devices storing volume data for the segment that has been flushed to the mass storage devices.

At 912, the first node and/or control plane applies an erasure code, such as an XOR erasure code, to the data read at 910 and to the write data. This generates a parity update for the write.

At 914, the first node and/or control plane sends the parity update to the node hosting the parity partition for the volume. Additionally, the first node and/or control plane includes a write number for the write with the parity update. Also, the first node and/or control plane may include a current sequence number for the volume with the parity update sent to the parity partition.

At 916, the node hosting the parity partition calculates a new parity for the segment of the volume that is implicated by the parity update. In order to calculate the new parity, the node reads parity data for the segment priority stored to the parity partition into a memory of the node and applies an erasure code that takes the parity update and the prior parity data as inputs and generates a recalculated parity as an output. The recalculated parity is then stored in the parity partition.

Example Computer System

Figure 10:
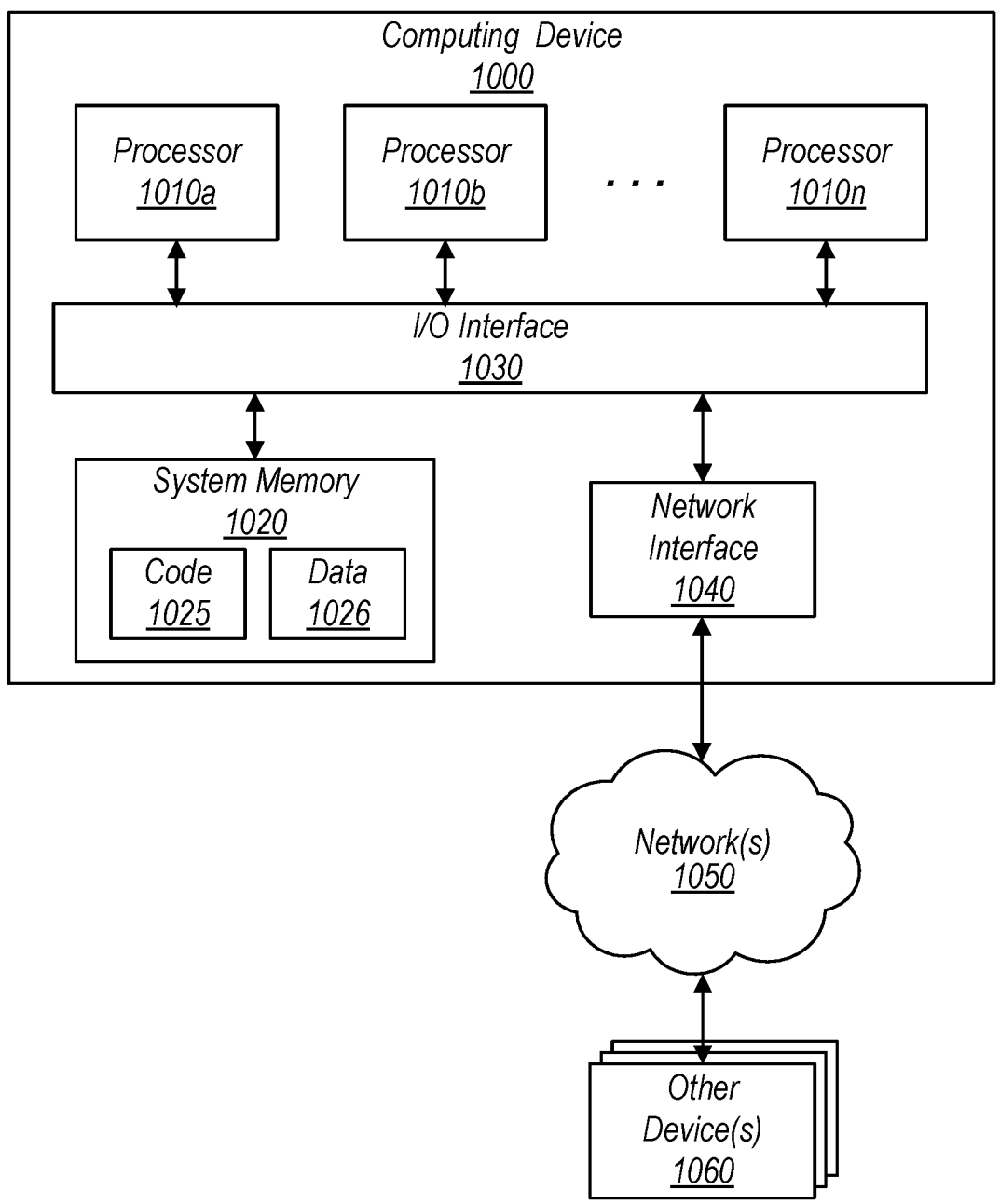
FIG. 10 is a block diagram illustrating an example computing system, according to some embodiments.

FIG. 10 is a block diagram illustrating an example computer system, according to various embodiments. For example, computer system 1000 may be configured to implement storage and/or nodes of a data storage system, storage and/or a sled controller of a data storage sled, other data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage unit node, and persistent storage 1060 may include the SSDs that include extents allocated to that node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a storage node, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Ethernet, Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A data storage system, comprising:
   a plurality of nodes, each node comprising a computing device and a storage device;
   one or more computing devices configured to implement a control plane for the data storage system, wherein the control plane is configured to:
   assign respective ones of a plurality of partitions of a volume to respective ones of the nodes, wherein the respective ones of the nodes are configured to host the assigned respective partitions of the volume;
   assign a volume-level or volume-partition-level parity partition for the volume to another one of the nodes, wherein the other one of the nodes is configured to host the assigned volume-level or volume-partition-level parity partition;
   generate, for the volume-level or volume-partition-level parity partition, volume-level or volume-partition-level parity data by applying an erasure code to volume data of one or more of the plurality of partitions of the volume, wherein the generated volume-level or volume-partition-level parity data is stored to the volume-level or volume-partition-level parity partition hosted by the other one of the nodes;
   cause the partitions of the volume and the volume-level or volume-partition-level parity partition for the volume to be stored on the respective ones of the nodes and the respective ones of the other nodes using a node level erasure coding or a node level replication, wherein the volume-level or volume-partition-level parity data is used as an input to the node level erasure coding or the node level replication; and
   reconstruct, in response to a failure of at least one of the partitions, a reconstructed version of the at least one partition using the volume-level or volume-partition-level parity data stored in the volume-level or volume-partition-level parity partition hosted by the other node of the data storage system.

2. The data storage system of claim 1, wherein the respective nodes are configured to:
   receive a write request directed to a segment of one of the plurality of partitions of the volume that is hosted by the respective node;
   read volume data for the segment from a storage of the respective node;
   generate a volume-level or volume-partition-level parity data update for the segment based on applying the erasure code to the volume data for the segment and the write data for the segment;
   calculate updated volume-level or volume-partition-level parity data for the segment based on volume-level or volume-partition-level parity data previously stored for the segment and the volume-level or volume-partition-level parity data update; and
   cause the updated volume-level or volume-partition-level parity data to be written to a segment of the volume-level or volume-partition-level parity partition storing volume-level or volume-partition-level parity data for the segment of the partition hosted by the respective node.

3. The data storage system of claim 2, wherein the respective nodes are further configured to:
   write the data included with the write request to the segment of the partition hosted by the respective node; and
   issue, without waiting for the updated volume-level or volume-partition-level parity data to be written to the volume-level or volume-partition-level parity partition, an acknowledgement that the write request has been committed.

4. The data storage system of claim 1, wherein the control plane is further configured to:
   determine that one or more additional partitions are to be stored in the data storage system for the volume;
   reassign respective partitions to respective ones of the nodes of the data storage system, wherein the additional nodes are configured to host the assigned respective partitions;
   reassign one or more volume-level or volume-partition-level parity partitions for the volume to one or more other nodes of the data storage system, wherein the one or more other nodes are configured to host the one or more volume-level or volume-partition-level parity partitions; and
   regenerate, for the one or more volume-level or volume-partition-level parity partitions, volume-level or volume-partition-level parity data by applying the erasure code to volume data of the respective partitions, wherein the generated volume-level or volume-partition-level parity data is stored in the one or more volume-level or volume-partition-level parity partitions hosted by the one or more other nodes.

5. A method comprising:
   storing, using node-level erasure coding or node-level replication, partitions of a volume in a plurality of nodes of a data storage system;
   storing, in another node of the data storage system, using node-level erasure coding or node level-replication, parity data for a volume-level or volume-partition-level parity partition for the volume, wherein the parity data is generated by applying an erasure code to volume data of the partitions of the volume, wherein the parity data is used as an input to the node-level erasure coding or the node level-replication;
   receiving a write request directed to a segment of one of the partitions of the volume;
   reading volume data for the segment from a storage of one of the nodes hosting the partition that includes the segment;

generating a parity data update for the segment based on applying the erasure code to write data of the write request and the volume data read for the segment to which the write request has been applied;

calculating, based on the parity data update, updated parity data for the segment to which the write request has been applied; and causing the updated parity data to be written to a segment of the volume-level or volume-partition-level parity partition storing parity data for the segment of the partition.

6. The method of claim 5, further comprising:

writing data included with the write request for the segment to the storage of the node hosting the partition that includes the segment; and issuing an acknowledgement that the write request has been committed, wherein:
said writing the data to the storage of the node hosting the partition and said issuing the acknowledgment that the write has been committed; and
said generating the parity data update, said calculating the updated parity data, and said causing the updated parity data to be written to the volume-level or volume-partition-level parity partition,
are performed asynchronously.

7. The method of claim 6, wherein said generating the parity data update, said calculating the updated parity data, and said causing the updated parity data to be written to the volume-level or volume-partition-level parity partition are performed outside of a series of steps required to be performed in order for the write to be acknowledged.

8. The method of claim 5, further comprising:

storing data included with the write request in a log-based storage of the node hosting the volume partition that includes the segment, wherein the node functions as a primary node for the volume partition; and causing the data included with the write request to be stored in a log-based storage of another one of the nodes of the data storage system that functions as a secondary node for the volume partition, wherein said causing the updated parity data to be written to a segment of the volume-level or volume-partition-level parity partition comprises causing the updated parity data to be stored in a log-based storage of the node hosting the volume-level or volume-partition-level parity partition.

9. The method of claim 8, further comprising:

storing a sequence number for the volume partition:
in the log-based storage of the primary node;
in the log-based storage of the secondary node; and
in the log-based storage of the node hosting the volume-level or volume-partition-level parity partition,
wherein the control plane of the data storage system is configured to issue a new sequence number for the volume partition in response to a change in membership of a set of nodes functioning as the primary node and the secondary node.

10. The method of claim 8, further comprising:

in response to one or more flush triggers being reached, causing data for the volume partition stored in the log-based storage of the primary node to be written to a set of mass storage devices of the data storage system, wherein, subsequent to receiving the write request, said reading volume data for the segment from the storage of one of the nodes hosting the partition comprises:

reading volume data for the segment from the log-based storage of the node; and reading volume data for the segment from one or more of the mass storage devices of the data storage system.

11. The method of claim 10, further comprising:

verifying that the updated parity partition data has been written to the volume-level or volume-partition-level parity partition prior to performing a flush operation that causes the data for the volume partition stored in the in the log-based storage of the primary node to be written to the set of mass storage devices of the data storage system.

12. The method of claim 5, further comprising:

receiving another write request directed to another segment of another one of the partitions of the volume;

reading volume data for the other segment from a storage of another one of the nodes hosting the other partition;

generating parity data update for the segment of the other partition based on applying the erasure code to write data includes with the other write request and the volume data for the segment of the other partition to which the other write request is directed; and causing the volume-level or volume-partition-level parity partition to be concurrently updated with the updated parity data for the partition and updated parity data for the other partition, wherein the updated parity data for the other partition is calculated based on the parity data update for the segment of the other partition.

13. The method of claim 5, further comprising:

selecting two or more nodes to host the volume-level or volume-partition-level parity partition based at least in part on respective I/O loads of the plurality of nodes of the data storage system.

14. One or more non-transitory, computer-readable storage media, storing program instructions that when executed on or across one or more processors cause the one or more processors to:

detect a failed partition of a plurality of partitions of a volume stored in a data storage system, wherein respective ones of the plurality of partitions are hosted by respective ones of a plurality of nodes of the data storage system, and wherein another node of the data storage system hosts a volume-level or volume-partition-level parity partition for the volume, wherein the volume-level or volume-partition-level parity partition comprises parity data generated by applying an erasure code to volume data of the plurality of partitions of the volume, and wherein the plurality of partitions and the volume-level or volume-partition-level parity partition are locally stored at a given node using a node-level erasure coding or a node-level replication, wherein the volume-level or volume-partition-level parity partition is used as an input to the node-level erasure coding or the node-level replication; and reconstruct the failed partition using the parity data of the volume-level or volume-partition-level parity partition hosted by the other node of the data storage system.

15. The one or more non-transitory, computer-readable storage media of claim 14, wherein the parity data includes one or more write numbers corresponding to one or more writes to the failed partition, wherein the program instructions, when executed on or across the one or more processors, further cause the one or more processors to:

determine whether the one or more write numbers of the parity data of the volume-level or volume-partition-level parity partition match one or more write numbers corresponding to writes that have been committed in the data storage system; and in response to determining the write numbers do not match, refrain from reconstructing the failed partition while one or more writes are performed at the volume-level or volume-partition-level parity partition such that the one or more write numbers of the parity data of the volume-level or volume-partition-level parity partition match the one or more write numbers corresponding to the writes that have been committed in the data storage system.

16. The one or more non-transitory, computer-readable storage media of claim 14, wherein the data storage system hosts a plurality of parity partitions for the volume, wherein the program instructions, when executed on or across the one or more processors, cause the one or more processors to:

reconstruct the failed partition using:
the parity data of the volume-level or volume-partition-level parity partition hosted by a first other node of the data storage system; and
parity data of one or more other volume-level or volume-partition-level parity partitions hosted by one or more other nodes of the data storage system.

17. The one or more non-transitory, computer-readable storage media of claim 14, wherein the parity data of the volume-level or volume-partition-level parity partition is stored in a log-based storage of a node of the data storage system and is stored in one or more mass storage devices of the data storage system, wherein to reconstruct the failed partition the program instructions, when executed on or across the one or more processors, cause the one or more processors to:

read the parity data from the one or more mass storage devices of the data storage system and the log-based storage of the node for the volume-level or volume-partition-level parity partition.

18. The one or more non-transitory, computer-readable storage media of claim 17, wherein the parity data stored in the one or more mass storage devices is erasure encoded, and wherein segments of the erasure encoded parity data is stored on different ones of a plurality of mass storage devices of the data storage system.

19. The one or more non-transitory, computer-readable storage media of claim 14, wherein the program instructions, when executed on or across the one or more processors, further cause the one or more processors to:

receive a volume creation request for a volume to be stored in the data storage system;

determine a number of partitions to be created in the data storage system for the volume;

assign respective ones of the partitions of the volume to respective ones of a plurality of nodes of the data storage system;

assign the volume-level or volume-partition-level parity partition for the volume to another one of the nodes of the data storage system;

generate, for the volume-level or volume-partition-level parity partition, parity data by applying an erasure code to volume data of the partitions of the volume; and cause the generated parity data to be stored to the volume-level or volume-partition-level parity partition hosted by the other one of the nodes of the data storage system.

20. The one or more non-transitory, computer-readable storage media of claim 19, wherein the program instructions, when executed on or across the one or more processors, further cause the one or more processors to:

read, in response to receiving a write request directed to a segment of one of the partitions of the volume, volume data for the segment from the partition of the volume that includes the segment;

generate a parity data update for the segment based on applying the erasure code to write data included with the write request and the volume data for the segment to prior to applying the write request;

calculate updated parity data for the segment based on the parity data update and parity data stored for the segment to which the write request has been applied; and cause the updated parity data to be written to a segment of the volume-level or volume-partition-level parity partition storing parity data for the segment of the partition.

* * * * *